United States Patent
Garg et al.

(10) Patent No.: US 12,423,320 B2
(45) Date of Patent: Sep. 23, 2025

(54) GENERATING AND UPDATING PAYLOAD SCHEMAS FOR MAINTAINING COMPATIBILITY IN EVOLVING DIGITAL SYSTEMS

(71) Applicant: Chime Financial, Inc., San Francisco, CA (US)

(72) Inventors: Bhashinee Garg, Oakland, CA (US); Nikita Uraltsev, Clayton, CA (US); Arun Mehta, San Francisco, CA (US); Sherin Thomas, San Francisco, CA (US); Karthik Raj, Oakland, CA (US); Jayanth Bharadwaj, New York, NY (US); Lucas Kacher, Walnut Creek, CA (US)

(73) Assignee: Chime Financial, Inc., San Francisco, CA (US)

( * ) Notice: Subject to any disclaimer, the term of this patent is extended or adjusted under 35 U.S.C. 154(b) by 274 days.

(21) Appl. No.: 17/930,623

(22) Filed: Sep. 8, 2022

(65) Prior Publication Data

US 2024/0086567 A1    Mar. 14, 2024

(51) Int. Cl.
  *G06F 16/25*   (2019.01)
  *G06F 8/65*   (2018.01)
  *G06F 16/21*   (2019.01)

(52) U.S. Cl.
  CPC .............. *G06F 16/258* (2019.01); *G06F 8/65* (2013.01); *G06F 16/212* (2019.01)

(58) Field of Classification Search
  CPC .... G06F 16/258; G06F 16/212; G06F 16/213; G06F 8/65
  See application file for complete search history.

(56) References Cited

U.S. PATENT DOCUMENTS

| | | | |
|---|---|---|---|
| 2004/0015783 A1* | 1/2004 | Lennon | G06F 16/258 715/255 |
| 2018/0046608 A1* | 2/2018 | Yousaf | G06F 3/14 |
| 2021/0056118 A1* | 2/2021 | Mitra | G06F 9/548 |
| 2022/0300469 A1* | 9/2022 | Agrawal | G06F 16/1794 |
| 2022/0414112 A1* | 12/2022 | Chandrasekaran | G06F 16/213 |
| 2023/0342342 A1* | 10/2023 | Pletcher | G06F 16/212 |

* cited by examiner

*Primary Examiner* — Hares Jami
(74) *Attorney, Agent, or Firm* — Keller Preece PLLC

(57) ABSTRACT

This disclosure describes a schema modification system that, as part of an inter-network facilitation system, can intelligently generate and update payload schemas for maintaining compatibility across changing network components. For example, the disclosed systems utilize custom tooling to detect changes in component versions and to update payload schemas to translate digital payloads between components that require different payload formats (e.g., due to an update to one component or another). In some cases, the disclosed systems can utilize a code generator to generate a payload conversion code from a payload schema and can implement the payload conversion code to convert a digital payload from a source format to a target format (e.g., to pass from a source component to a target component). The disclosed systems can also utilize schema annotations that accompany a payload schema to perform various functions, including removing sensitive information and identifying third-party systems.

20 Claims, 9 Drawing Sheets

GENERATING AND UPDATING PAYLOAD SCHEMAS FOR MAINTAINING COMPATIBILITY IN EVOLVING DIGITAL SYSTEMS

BACKGROUND

Recent cloud computing developments have led to improvements in networking systems that use interconnected servers to perform a wide variety of processes, from modifying digital images to predicting user account behavior. For example, in response to a client device interaction requesting specific information at a client device, existing networking systems can perform large numbers of processes very quickly to generate and provide the requested information in an interactive fashion, in (near) real time. Despite recent advances, however, existing networking systems continue to exhibit a number of drawbacks or deficiencies, particularly with regard to efficiency, security, and flexibility.

As just suggested, some existing networking systems are inefficient. In particular, conventional systems often require frequent reprogramming for updates to different services or subsystems. For instance, if one subsystem within the networking system receives an update that modifies its compatible data format, then, without further updates, other subsystems in communication with the updated subsystem lose their ability to receive data from or send data to the updated subsystem. To resolve this issue, some conventional systems require hardcoded reprogramming of each subsystem in communication with the updated subsystem to maintain compatibility. By requiring constant reprogramming for even minor updates, these existing systems waste computing resources, such as processing power and memory that could otherwise be preserved with more efficient methods.

Not only are some existing networking systems inefficient, but some networking systems lack cybersecurity protections for sensitive data. Particularly when passing data between various components or subsystems, many existing networking systems do so in a data agnostic fashion, indifferent to sensitive data that should be treated more securely. In some cases, conventional systems indiscreetly pass data even to third party systems, irrespective of whether the data includes private or sensitive information. Consequently, some existing systems risk data security of user accounts and internal subsystems, potentially exposing personally identifiable information to corruption or theft either accidentally or by malicious actors.

Additionally, certain conventional networking systems are inflexible. To elaborate, the components or subsystems of many conventional systems are rigidly fixed to specifically hardcoded payload formats. Indeed, as suggested above, some existing systems are not adaptable to maintain compatibility across component updates, and instead require hardcoded reprogramming of other components for each update, whether major or minor, to ensure data compatibility between the components or subsystems.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve efficiency, security, and flexibility by generating and updating payload schemas for maintaining compatibility in evolving digital systems. For example, the disclosed systems utilize specific tooling to detect changes in component versions and to update payload schemas to translate digital payloads between components that require different payload shapes or formats (e.g., due to an update to one component or another). In some cases, the disclosed systems can utilize a code generator to generate a payload conversion code from a payload schema and can implement the payload conversion code to convert a digital payload from a source shape/format to a target shape/format (e.g., to pass from a source component to a target component). The disclosed systems can also utilize schema annotations that accompany a payload schema to perform various functions, including removing sensitive information and identifying third-party systems.

BRIEF DESCRIPTION OF THE DRAWINGS

The detailed description refers to the drawings briefly described below.

DETAILED DESCRIPTION

Figure 1:
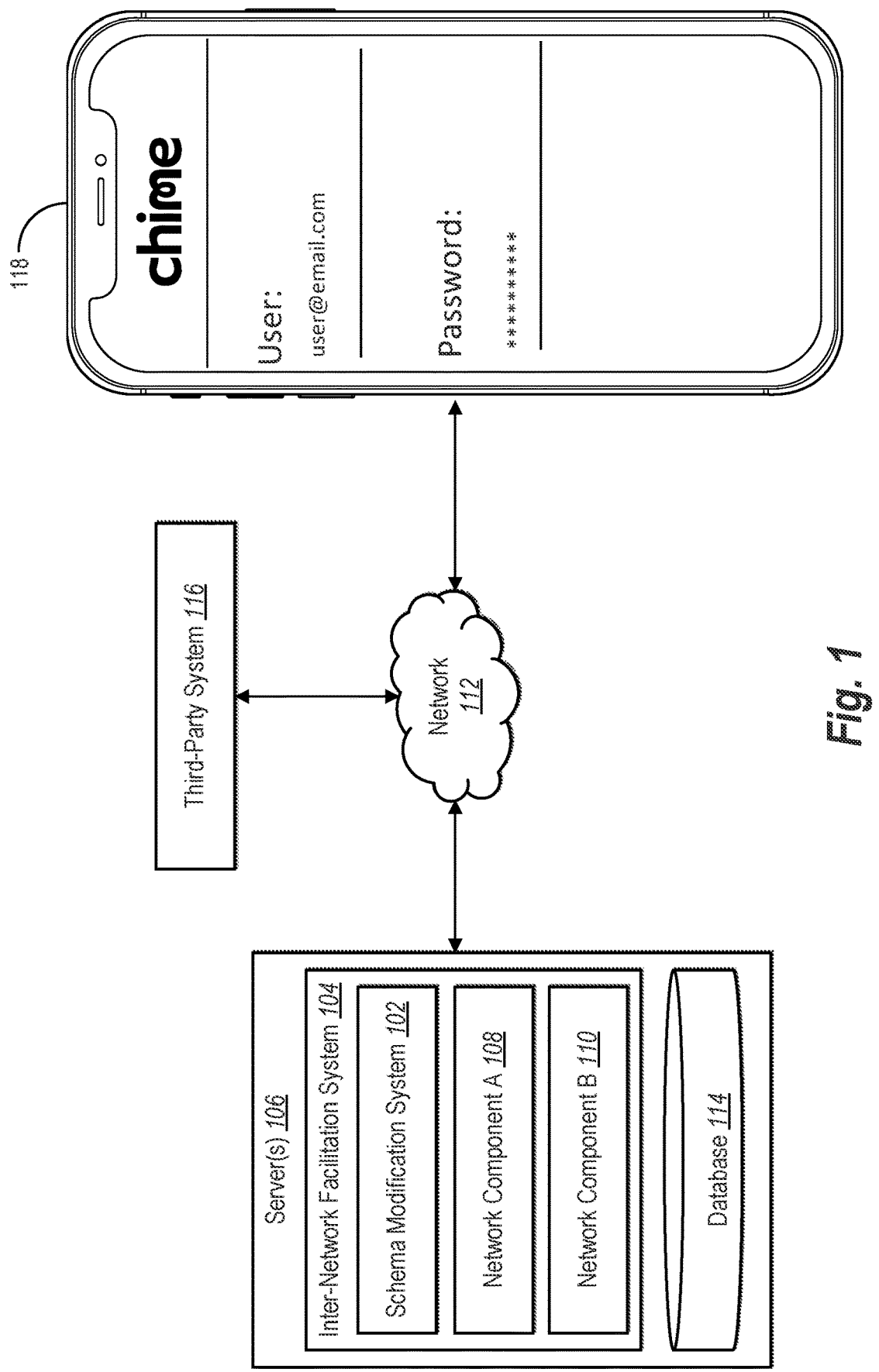
FIG. 1 illustrates a block diagram of an environment for implementing an inter-network facilitation system and a schema modification system in accordance with one or more embodiments.

This disclosure describes a schema modification system that can efficiently and flexibly adapt digital payload formats/shapes and/or payload schema for compatibility across various network components of a network-based system. In practical scenarios, network-based systems often utilize multiple servers hosting multiple compartmentalized components, modules, or services (with shared or independent processor(s)) to perform respective functions, where each of the network components processes data using its own respective data format. For instance, in response to a request from a client device to generate a new user account within a network-based system, the system uses several network components to perform the processes involved in generating the new user account, including: 1) ingesting the client device request, 2) generating a digital payload codifying the request into computer readable code, 3) passing the digital payload to an account generation engine, and 4) providing a confirmation message to the client device upon successful generation of the user account. In many cases, the different network components perform their respective functions by processing data in a certain format, where formats can vary across network components. Motivated by this issue, the schema modification system can determine a payload schema for converting a digital payload from a source format to a target format using a payload conversion code generator.

As just mentioned, the schema modification system can utilize payload schemas to convert digital payloads between formats. In particular, the schema modification system can receive or identify payload schemas to translate a digital payload from a format of a source network component to a component of a target network component (e.g., to pass the digital payload between network components without requiring hardcoded reprogramming). For example, the schema modification system can determine a payload schema that defines the organization of data (e.g., how the data is constructed, arranged, or organized) of a digital payload. In some cases, the payload schema defines the organization of the digital payload as generated by a server hosting a source network component and/or as required by a target network component.

Using a payload schema, the schema modification system can translate or convert a digital payload to pass from one network component to another (e.g., where the network components process data in different data formats). For example, the schema modification system can implement a particular transformation tool, such as a payload conversion code generator, to generate, from a payload schema, a payload conversion code that translates a digital payload from a source format to a target format. The schema modification system can further use the payload conversion code to convert a digital payload from a source format to a target format (e.g., to generate a target payload from a source payload). Further, the schema modification system can pass the digital payload in the target format (e.g., the target payload) from a source network component to a target network component to perform a certain function or process (e.g., as part of an inter-network facilitation system).

In some embodiments, the payload transformation tool—or the payload conversion code generator—evolves with changes or updates to an inter-network facilitation system. More specifically, the schema modification system updates or modifies (or receives updates or modifications to) the conversion code generator to evolve with changes to compatible formats of various network components. For instance, based on detecting a change to a source format and/or a target format (e.g., as a result of a version update coded for one or more network components), the schema modification system further determines or identifies a modified payload schema to adapt compatibility of digital payloads between the source format and the target format. In some cases, the schema modification system modifies the payload schema by redefining the organizational rules or paradigms of the payload schema according to the new format of the updated network component(s). Thus, the schema modification system can utilize the new or modified payload schema to generate, using the payload conversion code generator, a new payload conversion code for translating or converting a digital payload from a (modified) source format to a (modified) target format.

In one or more embodiments, the schema modification system utilizes schema annotations to further adapt digital payloads. Indeed, the schema modification system utilizes customized, unique payload schemas that, unlike schemas of prior systems, are annotatable at the file level, the payload level, and/or the field level. For example, the schema modification system receives an annotation to a payload schema to define various aspects of a digital payload, including: i) target network components (e.g., as internal network components of the inter-network facilitation system or as components of third-party systems), ii) indications of sensitive data, such as personally identifiable information ("PII"), iii) definitions for treatment for PII within a digital payload, and/or iv) definitions for how to validate one or more parameters of the digital payload (e.g., for validating a user account, an email address, a routing number, a social security number, or an account balance). Based on one or more schema annotations, the schema modification system can perform (or can cause a third party system to perform) parameter validation, PII removal or scrubbing, transmission of a digital payload to a specified destination such as a third-party system or an internal network component (e.g., within the inter-network facilitation system), or some other function.

As suggested above, the disclosed schema modification system provides several improvements or advantages over conventional networking systems. For example, the schema modification system can improve efficiency over prior systems. As opposed to prior systems that require frequent hardcoded reprogramming of various network components for even minor updates, the schema modification system translates payload formats utilizing a payload schema to generate a payload conversion code via an evolving payload conversion code generator. Indeed, by utilizing a payload schema as a single source of truth for digital payload (e.g., throughout an inter-network facilitation system), the schema modification system can automatically (e.g., without user interaction or hardcoding) adapt payload formats between network components to maintain compatibility, even after version updates. As a result of circumventing the need for hardcoded reprogramming, the schema modification system preserves computing resources (e.g., processing power and memory) wasted by prior systems that require hardcoding potentially large numbers of network components after every update.

In addition to improving efficiency, the schema modification system can also improve data security over existing networking systems. While some existing network systems are prone to exposing sensitive data through their unscrupulous data transmission (e.g., sharing data freely between network components and even to third-party systems irrespective of sensitive data), the schema modification system utilizes a novel payload schema that is annotatable to protect sensitive data, such as personally identifiable information. Indeed, before passing a digital payload between network components (or to a third-party system), the schema modification system can remove or scrub the digital payload of sensitive data (or otherwise obfuscate sensitive data) based on detecting certain schema annotations.

In some embodiments, the schema modification system also improves flexibility over prior networking systems. As suggested above, unlike prior systems that are rigidly fixed to specifically hardcoded payload formats, the schema modification system can flexibly adapt digital payloads for compatibility across network components. Indeed, even if the payload format of a target network component receiving a digital payload from a source network component is coded with a different payload format than the source network component, the schema modification system can utilize the novel payload schema and corresponding payload conversion code generator to flexibly adapt compatibility of the digital payload from a source format to a target format.

As indicated by the foregoing discussion, the present disclosure utilizes a variety of terms to describe features and advantages of the schema modification system. For example, as used herein, the term "inter-network facilitation system" refers to a system that, via the schema modification system, facilitates digital communications across different computing systems over one or more networks. For example, an inter-network facilitation system manages financial information, such as credit accounts, secured accounts, and other accounts for a single user account registered within the inter-network facilitation system. In some cases, the inter-network facilitation system is a centralized network system that includes multiple network components for facilitating access to online banking accounts, credit accounts, and other accounts via a central network location. Indeed, the inter-network facilitation system can link accounts from different network-based financial institutions to provide information regarding, and management tools for, the different accounts.

Relatedly, as used herein, the term "network component" (or sometimes simply "component") refers to a computer application or subsystem operated by one or more processors (hosted by one or more servers) that are dedicated to a particular computer task or process. For example, a network component can be part of a larger network-based system and can be communicatively coupled (e.g., via a computer network) to other network components for passing data therebetween to form a networking environment of cooperating network components. A network component can perform one or more tasks associated with one or more applications (e.g., client device applications) that access an inter-network facilitation system. Thus, an inter-network facilitation system can include multiple (containerized) network components that each perform respective functions as subsystems within the system. In certain embodiments, a network component refers to a server running a specific process, where a source network component refers to a first server and a target network component refers to a second server. In some cases, one network component receives and/or provides digital communications to a client device while another network component generates a digital payload for a request received from the client device (e.g., a request to generate a user account or a request to transfer funds to another user account) and yet another network component receives the digital payload to perform the requested function.

Indeed, a network component can refer to a "source network component" that generates and provides a digital payload to provide to a target network component. Additionally (or alternatively), a network component can refer to a "target network component" that receives a digital payload from a source network component. Within a pipeline of functions to accomplish a task requested by a client device (e.g., to transfer funds between user accounts), the schema modification system can use multiple source network components and multiple target network components to perform respective functions, where some network components are both sources and targets as they receive digital payloads from upstream components and provide different digital payloads to downstream components.

In some embodiments, a source network component generates a digital payload in a "source format" that refers to a shape, structure, makeup, construction, arrangement, and/or organization of computer data recognizable and processable by a source network component. In some cases, a source format refers to a particular data type (e.g., JSON, PROTOBUF, or some other data type) for a digital payload from a source network component. In the same or other embodiments, a target network component requires or requests a digital payload in a "target format" that refers to a shape, structure, makeup, construction, arrangement, and/or organization of computer data recognizable and processable by a target network component (e.g., where a target format may differ from a source format). In some cases, a target format refers to a particular data type (e.g., JSON, PROTOBUF, or some other data type) for a digital payload for a target network component.

Relatedly, as used herein, the term "digital payload" refers to a collection or a package of computer data that is passable from one network component to another. For example, a digital payload can have a particular format such as a data table, a matrix, or a vector, that is generated by one network component and passed to another network component within an inter-network facilitation (or to a third-party system). In some cases, a digital payload includes computer data (e.g., in JavaScript Object Notation or "JSON" format) for performing a particular process or function. As an example, a digital payload can include user account information, including a name, an email address, an account behavior log, an account balance, a social security number, a phone number, and/or other information.

As mentioned, in some embodiments, the schema modification system utilizes a payload schema to convert or translate a digital payload from a source format to a target format. As used herein, the term "payload schema" (or sometimes simply "schema") refers to a rule set or a formula set (e.g., integrity constraints) defining organization of computer data, such as a digital payload. For example, a payload schema can include computer code (e.g., a set of formulized integrity constraints) defining a digital blueprint of organizational parameters for a digital payload. In some cases, a payload schema can commonly define fields, formats, or data structures for describing features of a transaction/event over multiple network components and/or across different networks altogether. As an example, a payload schema can unify different schemas of different networks or systems to convert digital payloads in compatible formats, where the different schemas can include: a card transaction computer network can utilize a card network schema (having a first set of fields and formats), an ACH transaction computer network can utilize an ACH network schema (having a second set of fields and formats), and a transfer computer network can utilize a transfer network schema (having a third set of fields and formats).

As also mentioned, the schema modification system can utilize a payload schema to generate a payload conversion code for translating or converting a digital payload from a source format to a target format. As used herein, the term "payload conversion code" (or sometimes simply "conversion code") refers to computer generated algorithm or process for converting digital data from one format to another. For example, a payload conversion code can include an algorithm, such as a machine learning model, for a set of processes involved in translating a source payload into a target payload to ensure compatibility between a source network component and a target network component.

In some cases, the schema modification system generates a payload conversion code using a "payload conversion code generator" (or sometimes simply "code generator") that refers to a computer model (e.g., a machine learning model) or a set of algorithms for generating a payload conversion code. For example, a payload conversion code generator generates a payload conversion code from a payload schema by analyzing the payload schema to determine data modifications, format modifications, and/or other data changes for converting a digital payload from a source format to a target format. In some cases, a payload conversion code generator refers to a machine learning model such as a neural network that is trained to generate payload conversion codes from payload schemas.

In one or more described embodiments, the schema modification system generates a payload schema that is annotatable with schema annotations. As used herein, the term "schema annotation" (or sometimes simply "annotation") refers to a computerized indicator or digital flag that accompanies a payload schema and that designates all or part of the payload schema (or a digital payload) for a particular purpose. For example, a schema annotation can designate one or more parameter fields of a digital payload as containing sensitive data such as personally identifiable information. As another example, a schema annotation can designate a destination for a digital payload—e.g., to a target network component or to a third-party system external to the inter-network facilitation system. In some cases, the schema modification system generates a schema annotation at the file level (e.g., within a digital file included as part of a digital payload), the field level (e.g., within a specified parameter field of a digital payload), or the payload level (e.g., as universally applied to all fields of the digital payload).

As mentioned, in some embodiments, the schema modification system can generate digital payloads using machine learning models and/or for providing to machine learning models (e.g., to perform various tasks within the inter-network facilitation system). As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

Relatedly, the term "neural network" refers to a machine learning model that can be trained and/or tuned based on inputs to determine classifications or approximate unknown functions. In particular, the term neural network can include a model of interconnected artificial neurons (e.g., organized in layers) that communicate and learn to approximate complex functions and generate outputs (e.g., determinations of digital image classes) based on a plurality of inputs provided to the neural network. In addition, a neural network can refer to an algorithm (or set of algorithms) that implements deep learning techniques to model high-level abstractions in data.

Additional detail regarding the schema modification system will now be provided with reference to the figures. In particular, FIG. 1 illustrates a block diagram of a system environment for implementing a schema modification system 102 in accordance with one or more embodiments. As shown in FIG. 1, the environment includes server(s) 106 housing the schema modification system 102 as part of an inter-network facilitation system 104. The environment of FIG. 1 further includes a client device 118 and a third-party system 116. In some embodiments, the environment includes additional systems connected to the schema modification system 102, such as a credit processing system, an ATM system, or a merchant card processing system. The server(s) 106 can include one or more computing devices (and the database 114) to implement the schema modification system 102. Additional description regarding the illustrated computing devices (e.g., the server(s) 106, the client device 118, the third-party system 116, and/or the database 114) is provided with respect to FIGS. 7-8 below.

As shown, the schema modification system 102 utilizes the network 112 to communicate with the client device 118, and/or the third-party system 116. The network 112 may comprise any network described in relation to FIGS. 7-8. For example, the schema modification system 102 communicates with the client device 118 to provide and receive information pertaining to user accounts, financial transactions, account balances, funds transfers, or other information. Indeed, the inter-network facilitation system 104 or the schema modification system 102 can facilitate communication between various systems and client devices for performing network-based transactions. For example, schema modification system 102 or the inter-network facilitation system 104 can transfer funds between user accounts or can utilize machine learning models to generate predictions for transaction success or for advanced trust-based account balances (e.g., amounts based on historical user account behavior and previous balances).

To facilitate the functions of the inter-network facilitation system 104, in some embodiments, the schema modification system 102 communicates with different network components of the inter-network facilitation system 104, such as the network component A 108 and the network component B 110 (as well as the third-party system 116, and/or the database 114). More specifically, the schema modification system 102 generates and passes digital payloads between the network component A 108 and the network component B 110. Indeed, the schema modification system 102 can utilize the network component A 108 as a source network component to generate a digital payload in a source format. In turn, the schema modification system 102 can also utilize the network component B 110 as a target network component to receive and process the digital payload in a target format.

As indicated by FIG. 1, the client device 118 includes a client application. In many embodiments, the inter-network facilitation system 104 or the schema modification system 102 communicates with the client device 118 through the client application to, for example, receive and provide information including data pertaining to user actions for logins, account registrations, credit requests, transaction disputes, or online payments (or other client device information). In addition, the schema modification system 102 generates digital payloads from requests obtained from the client device 118 and generates displayable information from digital payloads to provide to the client device 118 in return (e.g., after utilizing multiple network components to process the digital payloads to perform a network task such as generating a new user account or transferring funds between user accounts).

As indicated above, the inter-network facilitation system 104 or the schema modification system 102 can provide (and/or cause the client device 118 to display or render) visual elements within a graphical user interface associated with the client application. For example, the inter-network facilitation system 104 or the schema modification system 102 can provide a graphical user interface that includes a login screen and/or an indication of successful or unsuccessful login. In some cases, the schema modification system 102 provides user interface information for a user interface for performing a different user action such as an account registration, a credit request, a transaction dispute, or an online payment. In some embodiments, the schema modification system 102 determines where a user action (e.g., a login) is successful and/or permissible based on various account data and/or machine learning predictions.

Although FIG. 1 illustrates the environment having a particular number and arrangement of components associated with the schema modification system 102, in some embodiments, the environment may include more or fewer components with varying configurations. For example, in some embodiments, the inter-network facilitation system 104 or the schema modification system 102 can communicate directly with the client device 118, the third-party system 116, and/or the database 114, bypassing the network 112. In these or other embodiments, the inter-network facilitation system 104 or the schema modification system 102 can be housed (entirely on in part) on the client device 118. Additionally, the inter-network facilitation system 104 or the schema modification system 102 can include (e.g., house) the database 114. Further, the inter-network facilitation system 104 can include more network components communicatively coupled together.

Figure 2:
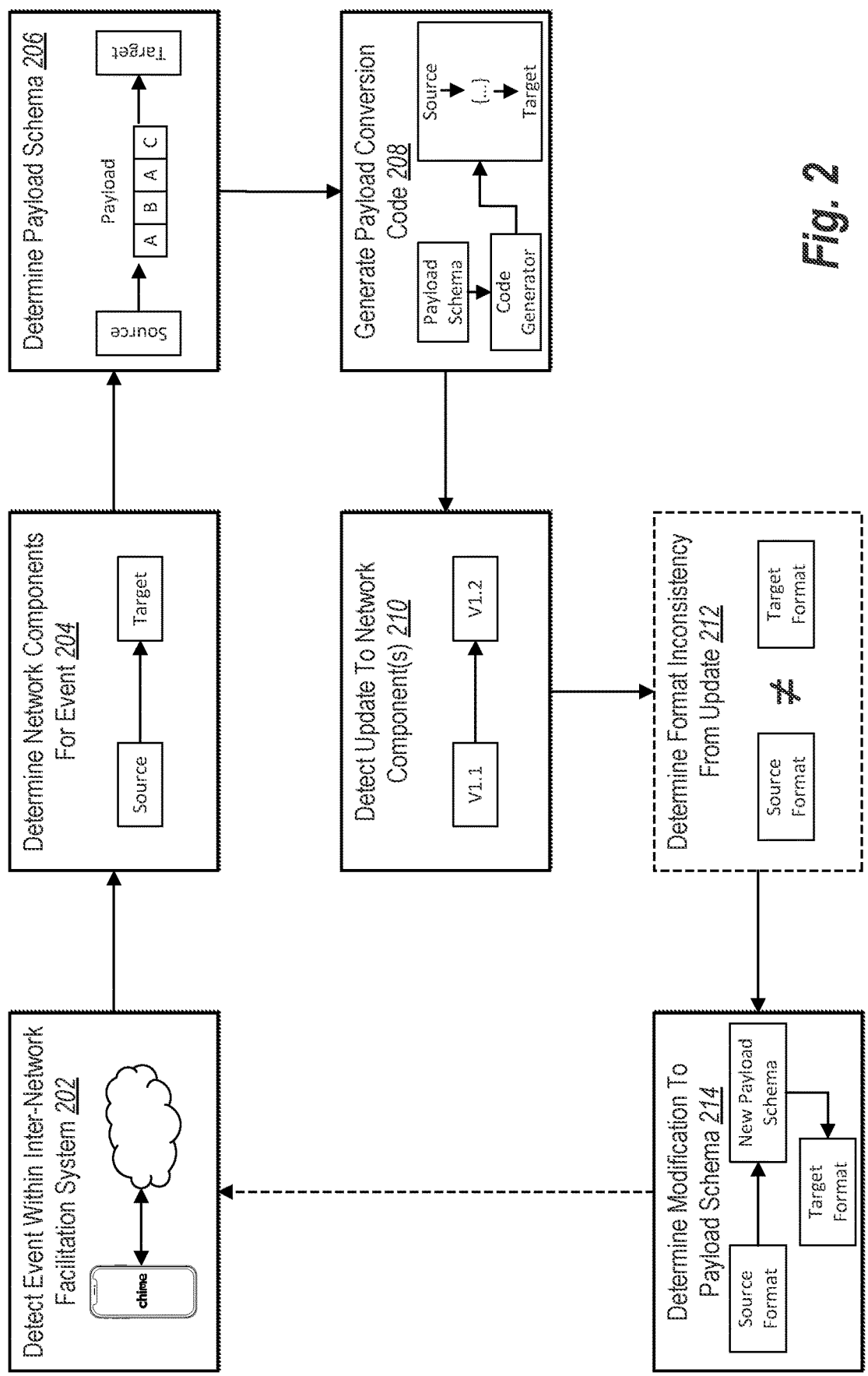
FIG. 2 illustrates an example overview of determining and utilizing a payload schema to convert a digital payload from a source format to a target format in accordance with one or more embodiments.

As mentioned, in certain embodiments, the schema modification system 102 can maintain compatibility of digital payloads across various network components by utilizing payload schemas. In particular, the schema modification system 102 can convert a digital payload from a source target to a target format utilizing a payload schema and a payload conversion code generator. FIG. 2 illustrates an example overview of generating and modifying a payload schema to adapt compatibility of digital payloads in accordance with one or more embodiments. Additional detail regarding the various acts illustrated in FIG. 2 is provided thereafter with reference to subsequent figures.

As illustrated in FIG. 2, the schema modification system 102 performs an act 202 to detect an event within an inter-network facilitation system (e.g., the inter-network facilitation system 104). In particular, the schema modification system 102 detects a network event by determining one or more actions or processes performed by a client device and/or a network component. Example events include an authorization event (e.g., authorization for a funds transfer), a settlement event, an account generation event, an account balance change event, or some other event. In some cases, the schema modification system 102 detects an event by detecting an event identifier associated with an event and defining the event within the inter-network facilitation system 104.

To illustrate, in processing network transactions, there are often a variety of different events that occur in updating digital accounts to reflect asset modifications. These events are often executed at different times using different network components. The events can correspond to digital transmissions that come from a variety of different computer networks, over a variety of different times, and using a variety of individual digital payloads. Accordingly, as downstream network components need to access information regarding events such as asset modifications, these network components utilize computer resources for transferring the pertinent information for executing the events.

As further illustrated in FIG. 2, the schema modification system 102 performs an act 204 to determine network components for the event. More specifically, the schema modification system 102 determines a source network component and a target network component for facilitating the event. For example, the schema modification system 102 determines a source network component where the event originates and determines a target network component where the event terminates. Indeed, in some cases, executing an event involves a source network component to initiate the event and a target network component to resolve the event. In these or other cases, executing an event involves multiple source network components and/or multiple target network components.

In some embodiments, the schema modification system 102 determines a source network component that generates a digital payload for the event. For instance, the schema modification system 102 determines a source network component such as a processor or a set of processors dedicated to receiving a new account request (e.g., a request to generate a new user account within the inter-network facilitation system 104, as received from the client device 108). The schema modification system 102 thus identifies the source network component that generates a digital payload corresponding to the new account request, including data or information in a particular source format. For example, the schema modification system 102 generates or fills a data table in a source format, with particular fields such as an account name field, an account type field, an account balance field, and/or other fields.

In addition, the schema modification system 102 determines a target network component that receives the digital payload generated by the source network component. For instance, the schema modification system 102 identifies the target network component as a processor or a set of processors (within the inter-network facilitation system 104) that receives a digital payload for a certain event. In some cases, the schema modification system 102 identifies the target network component for a new account request event as a network component that receives the data table and that executes a function using the data table (e.g., by generating the new user account within the inter-network facilitation system 104). The target network component can process the digital payload in a target format that may or may not differ from the source format. In some cases, the schema modification system 102 determines different network components for different events. For instance, the schema modification system 102 determines different source network components and/or target network components for different events such as new account request events, funds transfer events, credit request events, and/or other events.

In one or more embodiments, the target format for the digital payload (e.g., the format that a target network component utilizes to process a digital payload) differs from a source format for the digital payload (e.g., the format of the digital payload as generated by a source network component). Accordingly, the schema modification system 102 performs an act 206 to determine a payload schema. More specifically, the schema modification system 102 determines a unified payload schema for translating between different formats of a digital payload.

For instance, the schema modification system 102 determines (or receives or identifies) a payload schema for converting or translating a digital payload from a source format to a target format. In some cases, the payload schema is a single source of truth that includes schema definitions specific to the inter-network facilitation system 104 (e.g., protocol buffer or "PROTOBUF" definitions) and schema definitions for third-party systems (e.g., by including JSON schema code generation). In some embodiments, the schema modification system 102 utilizes a payload schema that can translate a digital payload between formats, from a source network component to a target network component (e.g., from a PROTOBUF format to a SNOW SQL format).

In some cases, the schema modification system 102 determines or receives a payload schema that is specific to the network component pair that includes the identified source network component and target network component. Indeed, the schema modification system 102 can identify or generate a payload schema that is tailored to specifically translate from the identified source network component to the identified target network component. For instance, the schema modification system 102 can utilize a per-event bus to identify event-specific payload schemas. In some cases, a payload schema can define (or include schema annotations that indicate) which network components are involved in an event corresponding to the payload schema, including which network component will generate a digital payload using the schema and which will consume the digital payload converted via the schema. In certain embodiments, a source network component communicates with a target network component to provide a digital payload, and the target network component provides an indication to the source network component confirming receipt of the digital payload.

In these or other embodiments, the schema modification system 102 determines a payload schema that is universal for translating across multiple network components within the inter-network facilitation system 104. For example, the schema modification system 102 utilizes a one-to-many payload schema, where the schema modification system 102 utilizes a source network component to generate a digital payload and broadcasts or streams the digital payload in a recipient-agnostic fashion. That is, the source network component does not receive a confirmation of receipt by/delivery to a target network component. Rather, the schema modification system 102 implements or communicates with a source network component that generates a digital payload and to make the digital payload available to or accessible by other network components. The schema modification system 102 can further utilize a payload schema to translate the digital payload on a per-component basis based on which network component accesses the digital payload and/or can do so in a universal fashion for compatibility across multiple network components which may access the digital payload.

As further illustrated in FIG. 2, the schema modification system 102 performs an act 208 to generate a payload conversion code. In particular, the schema modification system 102 generates a payload conversion code from a payload schema. In addition, the payload conversion code includes computer code for translating a digital payload from a source format to a target format. In some cases, the schema modification system 102 utilizes a particular code generator, such as a payload conversion code generator to generate a payload conversion code from a payload schema. Indeed, based on the payload schema indicating how to transition from a source payload to a target payload, the schema modification system 102 can utilize a conversion tool in the form of a code generator to generate the specific computer code required for translating a digital payload from a specified source format (e.g., specific to a particular source network component) to a specified target format (e.g., specific to a particular target network component).

Based on generating the payload conversion code, the schema modification system 102 can further generate a digital payload in a target format. In addition, the schema modification system 102 can execute an event using a target network component to process the digital payload. For instance, the schema modification system 102 executes a new account request event, a funds transfer event, a credit request event, and/or some other event.

As also illustrated in FIG. 2, the schema modification system 102 performs an act 210 to detect an update to one or more network components. More particularly, the schema modification system 102 detects a version update for a source network component and/or a target network component. For example, the schema modification system 102 receives an upload of a new hardcoded version of a network component to add new features, fix bugs, improve data security, and/or make other modifications. In some cases, the schema modification system 102 determines that a version update is backward compatible with a previous version of a network component (e.g., updating from version 1.1 to version 1.2, where version 1.2 is backward compatible with version 1.1). In other cases, the schema modification system 102 identifies a breaking change, where a newly updated version is backward incompatible with a previous version (e.g., updating from version 1.0 to version 2.0, where version 2.0 is backward incompatible with version 1.0).

Based on detecting the version update to the network component(s), in one or more embodiments, the schema modification system 102 further performs an act 212 to determine a format inconsistency from the update. To elaborate, the schema modification system 102 determines a format inconsistency where a payload format for a previous version of a network component is inconsistent with (e.g., not the same as) a payload format for a newly updated version of the network component. For example, the schema modification system 102 determines a format inconsistency between a source format and a target format that results from one or more of a source network component or a target network component receiving a version update.

In some cases, the schema modification system 102 determines a format inconsistency for a digital payload, where a source format includes data fields in a different order or a different arrangement than a target format. The schema modification system 102 can also determine a format inconsistency by determining that a source format includes more, fewer, and/or different data fields than a target format and/or by determining that a data field in a source format accepts a different parameter format than a corresponding data field in a target format. Even for backward incompatible version updates, the schema modification system 102 can determine format inconsistencies and attempt to reconcile them.

Indeed, as illustrated in FIG. 2, the schema modification system 102 performs an act 214 to determine a modification to a payload schema. In particular, the schema modification system 102 detects or receives a modified payload schema that adapts to the version update and/or the format inconsistencies that result from the version update. For example, the schema modification system 102 identifies an updated payload schema that accounts for format changes due to a version update to one or more of a source network component or a target network component. Accordingly, the schema modification system 102 utilizes, via a payload conversion code generator, the updated or modified payload schema to translate a digital payload from a (newly updated) source format to a (newly updated) target format, accounting for the version update.

In one or more embodiments, the schema modification system 102 can repeat the acts illustrated in FIG. 2. For example, the schema modification system 102 can repeat the acts 202-214 for different events to ensure that digital payload passed from network component to network component are in usable, compatible formats. Indeed, the schema modification system 102 automatically adapts or evolves payload schemas to accommodate version updates to network components and/or other format inconsistencies between source formats and target formats. The schema modification system 102 can thus efficiently and flexibly facilitate events across network components even when some network components use different payload formats than others.

Figure 3:
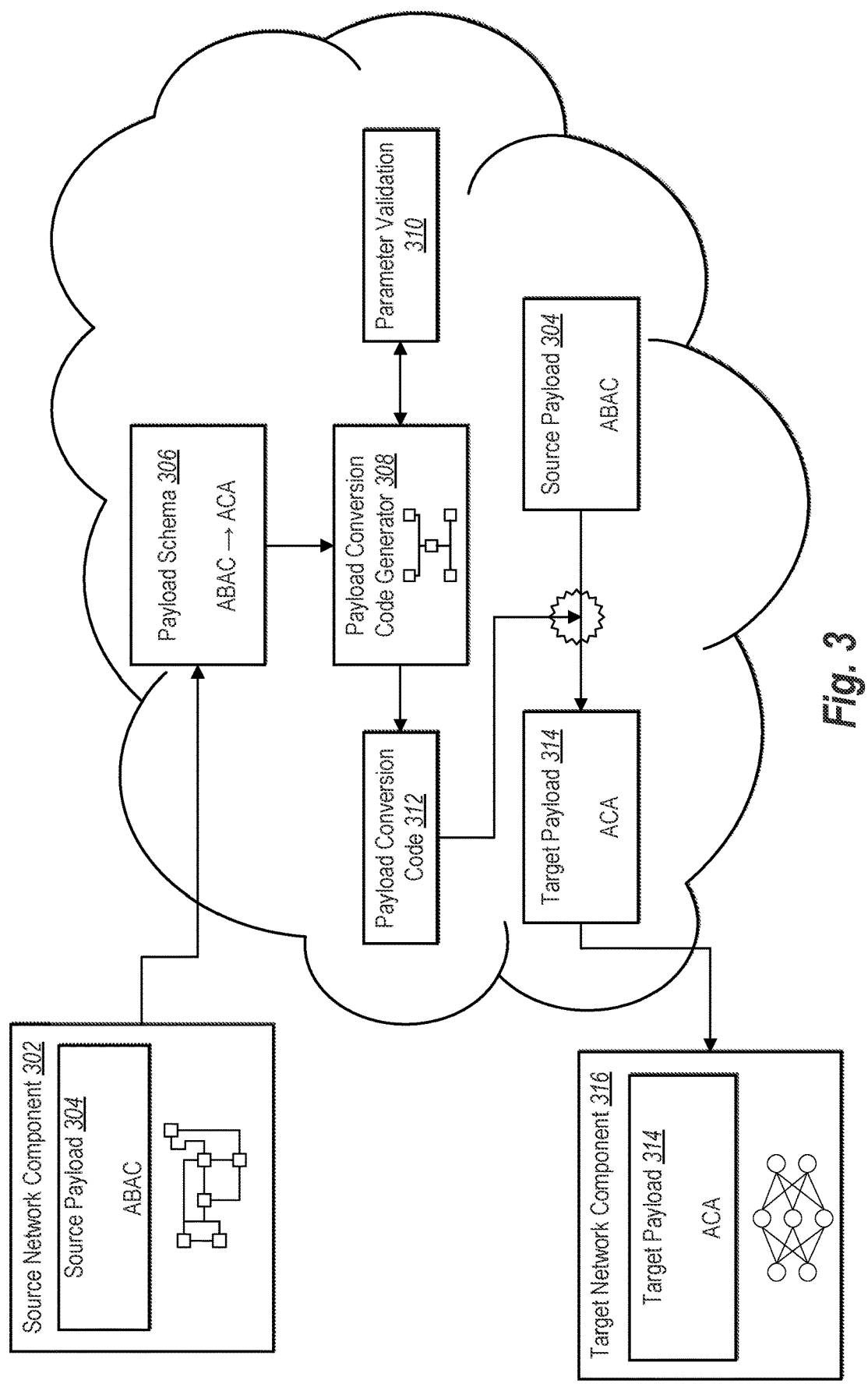
FIG. 3 illustrates an example diagram for utilizing a payload conversion code generator to convert a digital payload from a source format to a target format in accordance with one or more embodiments.

As mentioned, in certain described embodiments, the schema modification system 102 utilizes a payload schema to translate or convert a digital payload from a source format to a target format. In particular, the schema modification system 102 utilizes a payload schema to inform a payload conversion code generator in generating a payload conversion code for converting a digital payload from a source format to a target format. FIG. 3 illustrates a diagram for converting a digital payload from a source format to a target format in accordance with one or more embodiments.

As illustrated in FIG. 3, the schema modification system 102 detects an event that requires a source network component 302 and a target network component 316 to execute. As part of executing the event, the schema modification system 102 utilizes the source network component 302 to generate a source payload 304 (e.g., a digital payload in a source format). As shown, the source payload 304 has a format of "ABAC." This format is a simplified digital payload format for illustrative and descriptive purposes, as digital payloads may have much more complex formats with many fields and corresponding parameters.

As mentioned, the schema modification system 102 also identifies the target network component 316 used, together with the source network component 302, to execute the event. The schema modification system 102 further determines a target format for a target payload 314 associated with the target network component 316. As shown, the target payload 314 has a format of "ACA" (or some other format such as "AB," "BC," "AC," or "ACAB") which differs from the source format of "ABAC." Therefore, the schema modification system 102 determines that a conversion from the source format to the target format is necessary to execute or facilitate the event. In some cases, the schema modification system 102 defines an event according to the following pseudo code:

```
syntax = "proto3";
package chime.growth.v1;
import "chime/messages/v1/file_options.proto";
option (producers) = [@1debit/transactions-engine];
option (consumers) = [@1debit/server-consumer,
@1debit/bank-accountservice,
@1debit/server-processor];
option (destinations) = [SNOWFLAKE, AMPLITUDE, BRAZE];
option (description) = "Tracking balance changes";
message SampleEvent {
   option (chime.pii.v1.no_pii) = false;
   EventMetadata event_metadata = 1;
   int64 id = 2 [(chime.pii.v1.entity_type) = ENTITY_TYPE_NONE];
   // No PII
   string first_name = 3 [(chime.pii.v1.entity_type) =
   ENTITY_TYPE_NAME];
   string last_name = 4 [(chime.pii.v1.entity_type) =
   ENTITY_TYPE_NAME];
```

-continued

```
   string email = 5 [(chime.pii.v1.entity_type) =
   ENTITY_TYPE_EMAIL];
   string contact_info = 6 [
      (chime.pii.v1.entity_type) = ENTITY_TYPE_ADDRESS,
      (chime.pii.v1.entity_type) = ENTITY_TYPE_PHONE
   ];
}.
```

As shown, the schema modification system 102 utilizes a payload schema 306 to translate or convert the source payload 304. Indeed, the schema modification system 102 utilizes the payload schema 306 that includes computer code defining a structure or underlying formatting rules for organizing computer data of a digital payload so that the target network component 316 can interpret and utilize the digital payload. In some cases, the payload schema 306 is a unified or universal schema interpretable by many different network components. In other cases, the payload schema 306 is specific to the source network component 302 and/or the target network component 316.

As further illustrated in FIG. 3, the schema modification system 102 utilizes a payload conversion code generator 308 to generate a payload conversion code 312 from the payload schema 306. The payload conversion code generator 308 can include a machine learning model or some other tooling for generating computer code from a payload schema. For example, the schema modification system 102 utilizes the payload conversion code generator 308 to analyze or process the payload schema 306 to determine how to convert the source payload 304 into the target payload 314. In some cases, the payload conversion code generator 308 generates computer code that performs the translation or conversion from the source payload 304 to the target payload 314. As shown, the payload conversion code 312 includes code for converting the source payload 304 in the format "ABAC" into the target payload 314 in the format "ACA." For instance, the schema modification system 102 determines that the target network component 316 expects the target payload 314 in a particular format (e.g., JSON binary format), so the schema modification system 102 generates the payload conversion code 312 to perform the conversion of the source payload 304 into the particular format.

Additionally, the schema modification system 102 performs a parameter validation 310, or causes a third party system to perform parameter validation. To elaborate, the schema modification system 102 validates (or causes to be validated) one or more parameters (or fields) of the payload schema 306 according to schema annotations that accompany the payload schema 306 (e.g., by calling one or more APIs from a parameter validation system). Indeed, the schema modification system 102 can utilize a single source of information (e.g., the payload schema 306 and its annotations) to validate parameters (in a language-agnostic fashion), rather than writing validation logic in multiple places using different computer languages for different parameters, as in some prior systems.

For example, a schema annotation can indicate how to validate a particular parameter of the payload schema 306, such as validating a social security number parameter, an email address parameter, a credit card number parameter, or some other parameter. Accordingly, the schema modification system 102 validates a parameter according to the schema annotation by, for example, accessing a third-party system (e.g., a social security number system, an email system, or a credit card system) to verify that the parameter has a proper format (e.g., the correct number and/or type of characters) and/or is included within a third-party database (e.g., is not fake or made up).

For example, the schema modification system 102 can validate parameters by generating code to check specified limits on certain fields in a payload schema. Thus, when payloads that adhere to the schema are sent to a network component, the schema modification system 102 utilizes the generated validation code to automatically (e.g., without user interaction to prompt) check if the values in the payload are within the validation limit. Accordingly, the schema modification system 102 does not require custom code for every validation site, unlike some prior systems. In addition to the parameter validation 310, in some embodiments, the schema modification system 102 can perform other functions based on schema annotations. Additional detail regarding the various schema annotations and their functions is provided below in relation to subsequent figures.

Based on validating the parameters via the parameter validation 310, the schema modification system 102 utilizes the payload conversion code generator 308 to generate the payload conversion code 312. In some cases, the payload conversion code generator 308 includes one or more payload conversion components as part of the schema modification system 102, the inter-network facilitation system 104, and/or a third party code conversion system (e.g., the third-party system 116). If, however, the schema modification system 102 cannot validate one or more parameters when performing the parameter validation 310, the schema modification system 102 may not generate the payload conversion code 312. Instead, the schema modification system 102 may generate and provide an error notification to indicate which parameter(s) were unable to be validated. Using the payload conversion code, the schema modification system 102 translates the source payload 304 ("ABAC") into the target payload 314 ("ACA"). The schema modification system 102 further provides the target payload 314 to the target network component 316 for executing the event.

In one or more embodiments, the schema modification system 102 utilizes one or more machine learning models to execute an event. For example, the source network component 302 and/or the target network component 316 is a machine learning model, such as a neural network, a decision tree, or a linear regression model. In some cases, the schema modification system 102 utilizes the source network component 302 in the form of a machine learning model to generate the source payload 304 by extracting or encoding source data in the form of a matrix, a table, a vector embedding, a list, or some other data format. For instance, the source network component 302 generates the source payload 304 for a funds transfer, where the source payload 304 is a table that includes an originating user account field, a destination user account field, a transfer amount field, and a transfer time field.

Upon generating the target payload 314 using the payload schema 306 and the payload conversion code generator 308, the schema modification system 102 further executes the funds transfer event using the target network component 316. More specifically, the schema modification system 102 utilizes the target network component 316 in the form of a machine learning model to transfer the amount indicated in the target payload 314 from the indicated originating user account to the indicated destination user account.

In some embodiments, the schema modification system 102 utilizes machine learning models for the source network component 302 and/or the target network component 316 to perform different events. For example, the schema modification system 102 generates the source payload 304 for a credit amount prediction event. Specifically, the schema modification system 102 utilizes the source network component 302 in the form of a machine learning model to generate the source payload 304 indicating a user account, an account balance, a credit score, a trustworthiness rating, and/or historical user account interactions within the inter-network facilitation system 104 (e.g., previous transfers, previous purchases, previous deposits, and previous withdrawals).

Upon converting the source payload 304 into the target payload 314, the schema modification system 102 can further utilize the target network component 316 in the form of a machine learning model to generate a predicted credit amount for the user account. For instance, the schema modification system 102 utilizes the machine learning model to generate a prediction of a credit amount for the user account based on the various parameters of the target payload 314 (which can include a user account, an account balance, a credit score, a trustworthiness rating, and/or historical user account interactions).

Figure 4:
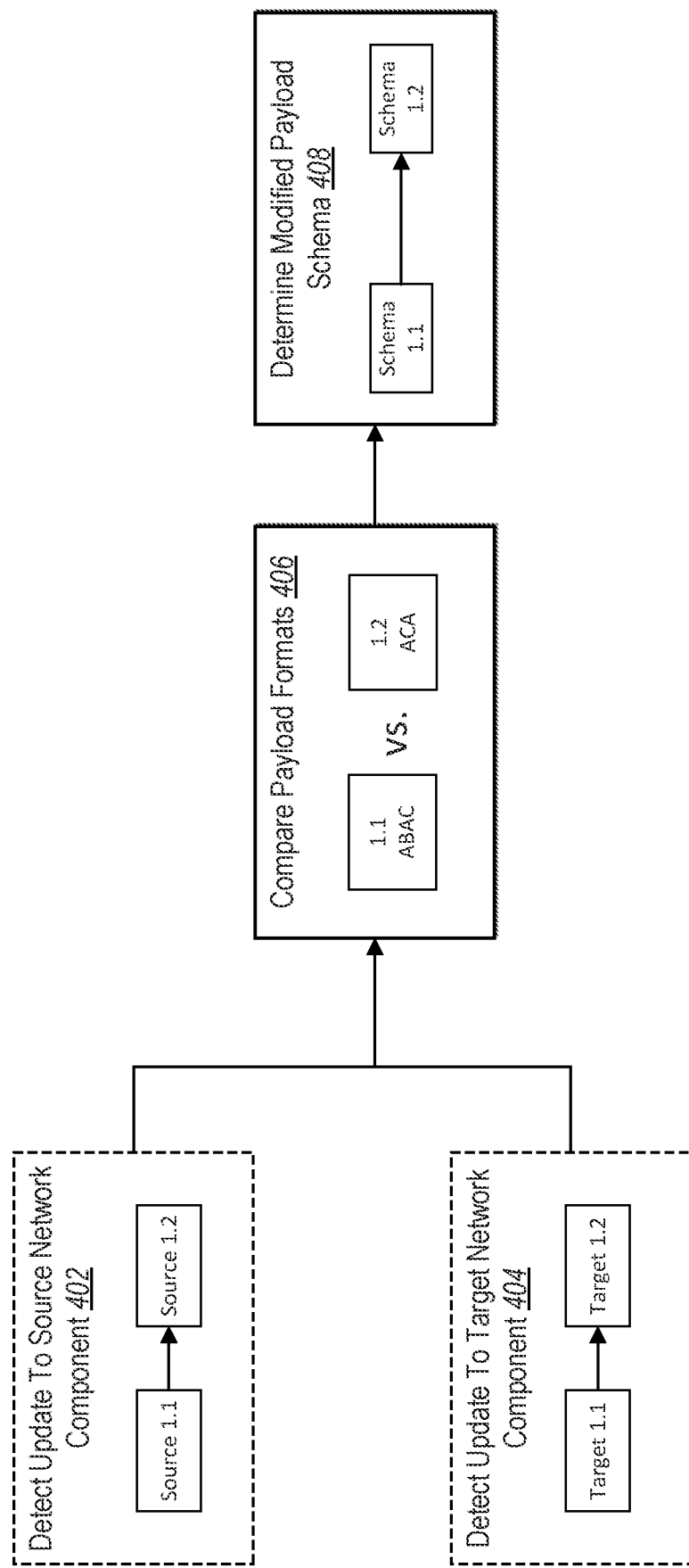
FIG. 4 illustrates an example diagram for modifying a payload schema based on a version update to a network component in accordance with one or more embodiments.

As mentioned, in certain described embodiments, the schema modification system 102 adapts or modifies a payload schema based on detecting a change to a source network component and/or a target network component. In particular, the schema modification system 102 can receive or identify a modified payload schema to adjust for a version update to a source network component and/or a version update to a target network component. FIG. 4 illustrates an example flow diagram for modifying a payload schema based on version updates to network components in accordance with one or more embodiments.

As illustrated in FIG. 4, in some embodiments, the schema modification system 102 performs an act 402 to detect an update to a source network component. In particular, the schema modification system 102 detects (or receives an indication of) a new software version of the source network component uploaded to the inter-network facilitation system 104. For example, the schema modification system 102 receives an update in the form of a new hardcoded version of a network component. In some cases, the schema modification system 102 receives a new version of a network component to add new features, fix bugs, improve data security, and/or make other modifications. In some embodiments, the update changes a source format for digital payloads generated or outputted by the source network component. For instance, the update causes a change in data fields of a digital payload by changing an order of data fields, removing a data field, adding a data field, and/or changing a format of a data field.

As also illustrated in FIG. 4, in some embodiments, the schema modification system 102 performs an act 404 to detect an update to a target network component. In particular, the schema modification system 102 detects (or receives an indication of) an upload of a new hardcoded version of the target network component. For example, the schema modification system 102 receives an update to a target network component that modifies data fields by changing an order of data fields, removing a data field, adding a data field, and/or changing a format of a data field.

In some cases, the schema modification system 102 receives an update to a network component that is backward compatible with a previous version of a network component. To elaborate, the schema modification system 102 detects or receives an update that does not change a format of a digital payload from a previous version and/or that changes a payload format in such a way that a previous or current payload schema is capable of facilitating translation of the digital payload (e.g., from a source format to a target format). In certain embodiments, the schema modification system 102 detects a breaking change, where the schema modification system 102 receives an update that is backward incompatible with a previous version of a network component. For example, the schema modification system 102 detects an update that changes a payload format by modifying a parameter type for a data field (e.g., from a character string to a number) such that the change in payload format renders a previous or current payload schema incapable of facilitating translation of the digital payload (e.g., from a source format to a target format).

In cases of backward compatible updates, and even in cases of backward incompatible updates, the schema modification system 102 includes mechanisms or tooling to adapt or modify a payload schema to maintain compatibility of digital payloads across network components. In some embodiments, based on detecting a version update that would result in a breaking change, the schema modification system 102 blocks or prevents the breaking change from taking place. For example, the schema modification system 102 determines whether a version update would break one or more applications that access the updated network component. If the schema modification system 102 determines that such an application break was to result from a version update, the schema modification system 102 provides a notification to an administrator device (e.g., a device uploading the new version of a network component and/or that defines a payload schema), prompting the administrator device to either override the block or to hardcode a new payload schema that can accommodate the breaking change.

As part of adapting a payload schema based on a version update to a network component, the schema modification system 102 performs an act 406 to compare payload formats. More specifically, the schema modification system 102 compares a previous payload format (e.g., "ABAC" for version 1.1) with a newly updated payload format (e.g., "ACA" for version 1.2). For example, the schema modification system 102 compares a format for a prior version of a (source or target) network component with that of a current or newly updated version. In some cases, the schema modification system 102 identifies differences or discrepancies between payload formats as a result of the comparison, such as a different order of data fields, a different number of data fields, and/or different parameter types (e.g., character strings or numbers) for data fields.

As further illustrated in FIG. 4, the schema modification system 102 performs an act 408 to determine a modified payload schema. In particular, the schema modification system 102 receives or detects a modified payload schema based on comparing the payload formats. For example, based on comparing the payload formats to identify one or more discrepancies between the formats of the prior and updated versions, the schema modification system 102 prompts generation of a modified payload schema to account for the discrepancies. In some cases, the schema modification system 102 generates a new or modified payload schema that adapts to translating or converting a digital payload between (newly updated) network components.

In one or more embodiments, the schema modification system 102 utilizes a schema generation machine learning model to modify the payload schema. To elaborate, the schema modification system 102 utilizes a schema generation machine learning model trained to generate payload schema from certain data. For example, the schema modification system 102 inputs a source format and a target format into a schema generation machine learning model, whereupon the schema generation machine learning model generates a payload schema. As another example, the schema modification system 102 inputs a source network component and a target network component into the schema generation machine learning model, whereupon the schema modification system generates a payload schema. For instance, the schema modification system 102 inputs a source format and a target format into the schema generation machine learning model, and the schema generation machine learning model generates a predicted payload schema that can translate from the source format to the target format (e.g., based on its internal parameters such as weights and biases).

In some embodiments, the schema modification system 102 detects or receives an update to a payload schema. For example, the schema modification system 102 can utilize a versioning technique to evolve a payload schema for translating between different payload formats and/or across various network components. Based on the update to the payload schema, the schema modification system 102 determines whether the update to the payload schema is a backward compatible change or a breaking (e.g., backward incompatible) change. Specifically, the schema modification system 102 detects whether the newly updated schema can translate between payload formats and/or network components. If so, the update is backward compatible and the schema modification system 102 proceeds as normal to translate digital payloads for network components. If not, the update is a breaking change, and the schema modification system 102 can generate a notification of the breaking change to prompt updates of one or more network components to reestablish compatibility and conversion of digital payloads from one network component to another via the modified payload schema. Thus, the schema modification system 102 can facilitate payload compatibility between network components without requiring modification (e.g., coding changes) to the network components.

Figure 5:
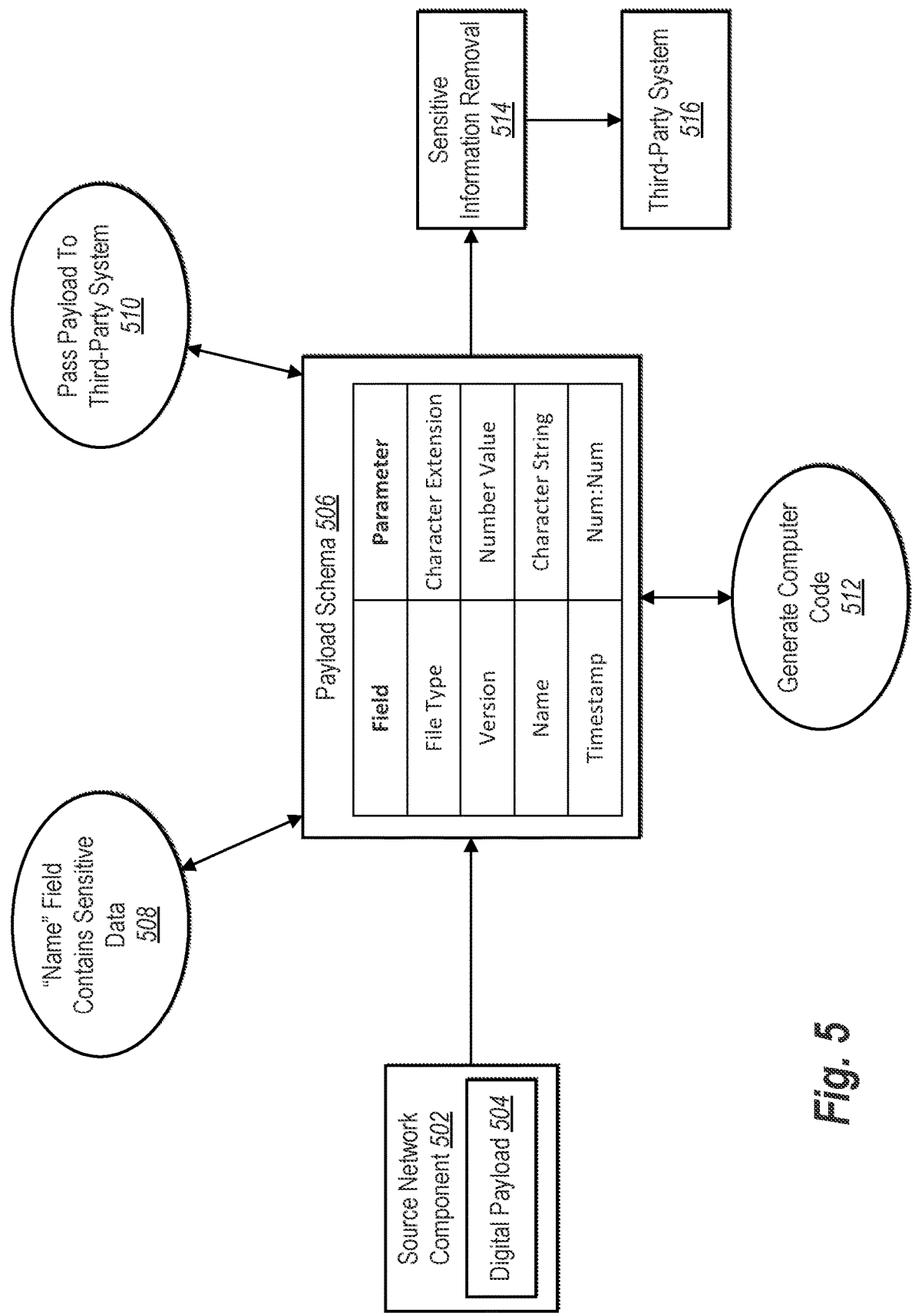
FIG. 5 illustrates an example payload schema and schema annotations in accordance with one or more embodiments.

As mentioned above, in certain described embodiments, the schema modification system 102 utilizes schema annotations to perform additional functions with regard to payload schemas. In particular, the schema modification system 102 utilizes schema annotations to remove sensitive information, pass digital payloads to third-party systems, validate parameters, and/or perform other functions. FIG. 5 illustrates an example flow diagram for generating schema annotations and performing annotation-specific functions in accordance with one or more embodiments.

As illustrated in FIG. 5, the schema modification system 102 identifies a source network component 502. In particular, the schema modification system 102 identifies a source network component as a network component that generates a digital payload 504 to pass to a target network component or to a third-party system (e.g., the third-party system 116). Indeed, as described herein, the source network component 502 can generate the digital payload 504 in a source format.

In certain embodiments, the schema modification system 102 generates the digital payload 504 according to the following pseudo code:

```
{
  "payload"; <bytes>, # event payload
  "context": { } # event metadata, includes 'creation_timestamp'
}.
```

In some cases, the digital payload 504 has a source format defined by a PROTOBUF schema. In these or other cases, the schema modification system 102 generates and/or utilizes the payload schema having a PROTOBUF format (i.e., a PROTOBUF schema) convertible and/or translatable to other schemas or formats for target network components (or third-party systems). For example, the schema modification system 102 uses a PROTOBUF schema given by the following pseudo code:

```
// proto/chime/growth/v1/widget_list_loaded.proto
syntax = "proto3";
package chime.growth.v1;
// Enum describing possible types of widget priority tier.
enum WidgetTier {
   WIDGET_TIER_INVALID = 0;
   WIDGET_TIER_CORE = 1;
   WIDGET_TIER_NON_CORE = 2;
}
// Server side event when server sends the widget list to mobile.
message WidgetListLoaded {
   // Priority of widget query
   WidgetTier widget_tier = 1;
   // Client version where widgets are being rendered
   string version = 2;
   // Name of the widgets
   repeated string widget_ids = 3;
   // Raw widget json string for debugging purposes
   string raw_widget_json = 4;
}.
```

As further illustrated in FIG. 5, the schema modification system 102 generates, determines, or receives a payload schema 506 for converting the digital payload 504 from a source format to a target format. As mentioned, the payload schema 506 includes computer code defining the structure or organization of data for the digital payload 504. As shown, the payload schema 506 defines the organization of the digital payload 504 as (or converts the digital payload 504 into a format including) a data table that includes two columns, one for "Field," and the other for "Parameter." Indeed, the payload schema 506 defines the digital payload 504 to include fields such as "File Type," "Version," "Name," and "Timestamp." Corresponding to the respective data fields, the payload schema 506 defines parameters as character extensions, number values, character strings, or in some other specified format (e.g., two numbers with a colon in between). From the payload schema 506, the schema modification system 102 determines that certain fields require certain parameter formats, such as a number value for the "Version" field or a character string for the "Name" field.

In one or more implementations, the schema modification system 102 utilizes the payload schema 506 to generate a target format version of the digital payload 504. For example, the schema modification system 102 generates the target format defined by a JSON schema, given by the following pseudo code:

```
{
   "$schema": "http://json-schema.org/draft-04/schema#"
   "properties": {
      "widget_tier": {
         "enum": [
            "WIDGET_TIER_INVALID",
            0,
            "WIDGET_TIER_CORE",
            1,
            "WIDGET_TIER_NON_CORE",
```

```
            2
         ],
         "T": [
            {
               "type": "string"
            },
            {
               "type": "integer"
            }
         ],
         "description": "Priority of widget query"
      },
      "version": {
         "type": "string",
         "description": "Client version where widgets are being rendered"
      },
      "widget_ids": {
         "items": {
            "type": "string"
         },
         "type": "array",
         "description": "Name of the widgets"
      },
      "raw_widget_json": {
         "type": "string",
         "description": "Raw widget json string for debugging purposes"
      }
   },
   "additionalProperties": true,
   "type": "object",
   "description": "Server side event when server sends the widget list to mobile."
}.
```

In certain embodiments, the schema modification system 102 generates and utilizes tracking plans as part of defining and enforcing schemas for events. In some cases, the schema modification system 102 utilizes SEGMENT protocols for tracking plans and JSON schemas to validate digital payloads for SEGMENT events. In some embodiments, the schema modification system 102 uses SEGMENT as an event streaming platform (e.g., to a database like SNOWFLAKE). To facilitate such functionality, the schema modification system 102 uses a script to map SEGMENT events to a JSON schema to update the corresponding tracking plans. The schema modification system 102 can generate a JSON schema for an event in a tracking plan according to the following pseudo code (e.g., for an instant transfer event):

```
# Instant Transfer Succeeded
{
   "$schema": "http://json-schema.org/draft-07/schema#",
   "type": "object",
   "labels": { },
   "properties": {
      "context": {
         "id": "/properties/context"
      },
      "traits": {
         "type": "object",
         "id": "/properties/traits"
      },
      "properties": {
         "type": "object",
         "properties": {
            "linked_card_id": {
               "description": "",
               "type": "object",
               "id": "/properties/properties/properties/linked_card_id"
            },
            "user_id": {
               "description": "",
```

```
            "id": "/properties/properties/properties/user_id"
          }
        },
        "id": "/properties/properties"
      }
    }
  }
}.
```

In some embodiments, the schema modification system 102 can utilize a curl command to send a generated tracking plan. For instance, schema modification system 102 can generate a tracking plan according to the following pseudo code:

```
curl -location -request POST 'https://platform.segmentapis.com
/v1beta/workspaces/myworkspace/tracking-plans/' \
--header 'Authorization: Bearer ...' \
--header 'Content-Type: application/json' \
--data-raw '{
  "tracking_plan": {
  "display_name": "Instant Transfer Succeeded",
  "rules": {
    "global": {
      "$schema": "http://json-schema.org/draft-04/schema#",
      "type": "object",
      "properties": {
        "context": {
          "type": "object",
          "properties": {
            "library": {
              "type": ["object"]
            }
          },
          "required": [ "library" ]
        },
        "properties": { },
        "traits": { }
      }
    },
    "events": [
      {
        "name": "Instant Transfer Succeeded",
        "description": "Instant Transfer Succeeded",
        "rules": {
          "$schema": "http://json-schema.org/draft-04/schema#",
          "type": "object",
          "properties": {
            "context": { },
            "properties": {
              "type": "object",
              "properties": {
                "linked_card_id": {
                  "type": [ "object" ]
                },
                "user_id": { } # Type: Any
              },
              "required": [
                "linked_card_id"
                # user_id is optional
              ]
            },
            "traits": { }
          }
        }
      }
    ],
    "identify": { },
    "group": { }
  }
  }
}'.
```

In one or more embodiments, the schema modification system 102 updates a tracking plan according to the following pseudo code:

```
curl -location -request PUT 'https://platform.segmentapis.com/v1beta
/workspaces/myworkspace/tracking-plans/rs_123' \
--header 'Authorization: Bearer ...' \
--header 'Content-Type: application/json' \
--data-raw '{
  "update_mask": {
    "paths": [
      "tracking_plan.display_name",
      "tracking_plan.rules"
    ]
  },
  "tracking_plan": {
    "display_name": "Instant Transfer Succeeded - Updated",
    "rules": {
      "global": {
        "$schema": "http://json-schema.org/draft-04/schema#",
        "type": "object",
        "properties": {
          "context": {
            "type": "object",
            "properties": {
              "userAgent": { }
            },
            "required": [
              "userAgent"
            ]
          }
        },
        "required": [
          "context"
        ]
      },
      "events": [
        {
          "name": "Instant Transfer Succeeded",
          "description": "Instant Transfer Succeeded",
          "rules": {
            "$schema": "http://json-schema.org/draft-04/schema#",
            "type": "object",
            "properties": {
              "properties": {
                "type": "object",
                "properties": {
                  "linked_card_id": {
                    "type": [ "object" ]
                  }
                },
                "required": [
                  "linked_card_id"
                ]
              }
            },
            "required": [
              "properties"
            ]
          }
        }
      ]
    }
  }
}'.
```

In certain embodiments, the schema modification system 102 receives (and/or uploads) a tracking plan request according to the following pseudo code:

```
# The schema modification system 102 derives the tracking plan's JSON
schema from the JSON schema generated by a payload conversion code
generator in the form of a PROTOBUF to JSON schema compiler.
Curl -location -request POST 'https://platform.segmentapis.com
/v1beta/workspaces/1debit/tracking-plans/' \
--header 'Authorization: Bearer ...' \
--header 'Content-Type: application/json' \
--data-raw '{
  "tracking_plan": {
    "display_name": "WidgetListLoaded",
    "rules": {
      "global": {
```

```
"$schema": "http://json-schema.org/draft-04/schema#",
"type": "object",
"properties": {
    "context": {
        "type": "object",
        "properties": {
            "library": {
                "type": [ "object" ]
            }
        },
        "required": [ "library" ]
    },
    "properties": { },
    "traits": { }
},
"events": [
    {
        "name": "WidgetListLoaded",
        "description": "Server side event when server sends the widget list to mobile.",
        "rules": {
            "$schema": "http://json-schema.org/draft-04/schema#"
            "type": "object",
            "properties": {
                "context": { },
                "properties": {
                    "type": "object",
                    "properties": { # properties from JSON schema
                        "widget_tier"; {
                            "enum": [
                                "WIDGET_TIER_IN
                                VALID",
                                0,
                                "WIDGET_TIER_CO
                                RE",
                                1,
                                "WIDGET_TIER_N
                                ON_CORE",
                                2
                            ],
                            "T": [
                                {
                                    "type": "string"
                                },
                                {
                                    "type": "integer"
                                }
                            ],
                            "description": "Priority of widget query"
                        },
                        "version": {
                            "type": "string",
                            "description": "Client version where widgets are being rendered"
                        },
                        "widget_ids": {
                            "items": {
                                "type": "string"
                            },
                            "type": "array",
                            "description": "Name of the widgets"
                        },
                        "raw_widget_json": {
                            "type": "string",
                            "description": "Raw widget json string for debugging purposes"
                        }
                    }
                },
                "traits": { }
            }
        }
    }
],
"identify": { },
"group": { }
```

```
    }
  }
}".
```

As also illustrated in FIG. 5, the schema modification system 102 generates or identifies schema annotations that accompany the payload schema 506. In particular, the schema modification system 102 receives user interaction from an administrator device (e.g., a device that hardcodes or defines the payload schema 506) to define one or more schema annotations that are part of or that are stored in conjunction with the payload schema 506. For example, the schema modification system 102 generates the payload schema 506 to be annotatable at multiple levels, where schema annotations are at one or more levels, including: i) the file level, where the annotation applies to indicated data within a specified file; ii) the payload level (or the message level), where the annotation applies to indicated data included as part of a digital payload (e.g., a message sent between network components); or iii) the field level, where the annotation applies to a data parameter associated with a particular data field of a digital payload.

As shown, the schema modification system 102 includes a schema annotation 508 with the payload schema 506. In particular, the schema annotation 508 indicates that the "Name" field contains sensitive data. Indeed, the schema modification system 102 can utilize schema annotations to identify and manage sensitive data such as personally identifiable information, including social security numbers, email addresses, phone numbers, bank account numbers, and/or other sensitive information. Personally identifiable information includes parameters within a digital payload that could be used to confirm an individual's identity, such as a user account within the inter-network facilitation system. Accordingly, the schema annotation 508 indicates that the "Name" field includes personally identifiable information because the corresponding parameter includes the name associated with a user account within the inter-network facilitation system 104.

In some cases, the schema annotation 508 further defines treatment for the sensitive data within the "Name" field, such as removal or scrubbing of the parameter associated with the field. In certain embodiments, the schema annotation 508 indicates to remove the sensitive data upon detecting that the digital payload 504 is to be sent to a third-party system, outside of the inter-network facilitation system 104. As illustrated, the schema modification system 102 thus performs sensitive information removal 514 before providing the digital payload 504 to the third-party system 516 (e.g., the third-party system 116). Accordingly, the schema modification system 102 improves data security using the annotatable payload schema 506 to prevent dissemination of sensitive information to third-party systems.

In certain embodiments, the schema modification system 102 utilizes multiple schema annotations together. As shown, the payload schema 506 is associated with a schema annotation 510 which designates a destination for the digital payload 504. Particularly, the schema annotation 510 indicates that the digital payload 504 is to be provided to a third-party system (e.g., the third-party system 516). Thus, the schema modification system 102 can analyze the schema annotation 508 and the schema annotation 510 together to determine that the sensitive information within the "Name" field is to be removed. Indeed, the schema modification system 102 can determine that, because the schema annotation 510 indicates the destination of the digital payload 504 to be the third-party system 516, and because the schema annotation 508 indicates that the "Name" field includes sensitive data, then the parameter corresponding to the "Name" field is to be scrubbed before providing the digital payload 504 to the third-party system 516.

In some embodiments, the schema modification system 102 uses schema annotations to indicate multiple levels of data sensitivity (and to indicate corresponding data treatment). For example, the schema modification system 102 may identify a schema annotation that indicates data sensitivity levels of the various data fields within the digital payload 504. In some cases, the schema modification system 102 further identifies a schema annotation (e.g., the same schema annotation or a different schema annotation) that indicates a sensitivity threshold for scrubbing data parameters from the digital payload 504. For instance, the schema modification system 102 may determine, according to one or more schema annotations, that parameters associated with data fields having a sensitivity level of 3 or higher (e.g., on a scale of 1 to 5 or 1 to 10) should be removed before sending the digital payload 504 to the third-party system 516.

In one or more embodiments, the schema modification system 102 can utilize additional or alternative schema annotations. For example, as illustrated in FIG. 5, the schema annotation 512 indicates to generate computer code (e.g., to prompt the source network component 502 and/or a target network component to generate some specified computer code in a specific language such as RUBY, PYTHON, or some other computer language). Other schema annotations can include annotations to validate parameters within the digital payload 504 (e.g., by verifying authenticity of a parameter such as a social security number or an email address, as described above). Still other schema annotations can indicate specific uses or applications for data fields or corresponding parameters of the digital payload 504. In some embodiments, the schema modification system 102 utilizes a schema annotation to block or remove data parameters for fields other than sensitive fields (e.g., for a specific application or use case).

Figure 6:
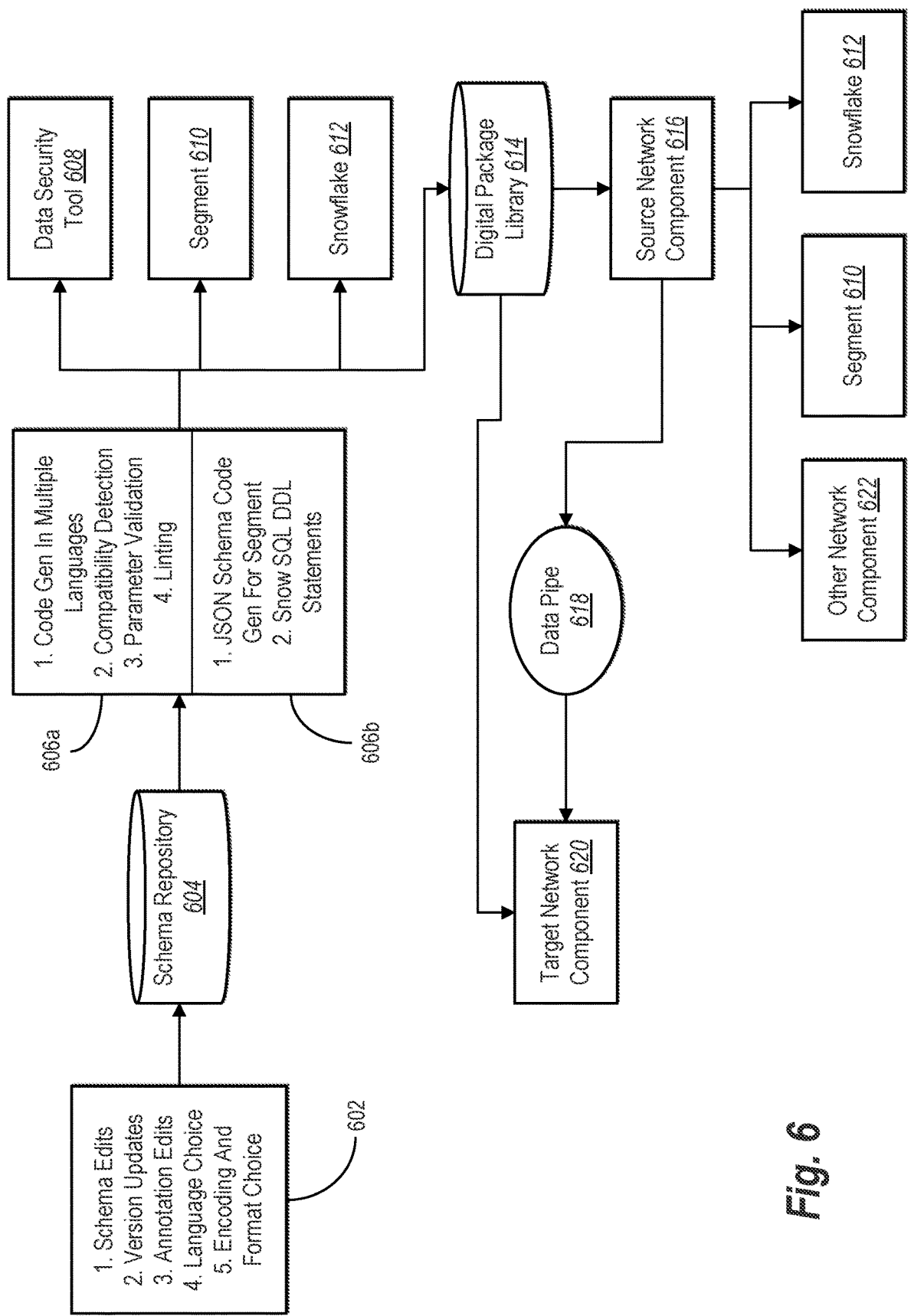
FIG. 6 illustrates an example diagram for using payload schemas to convert digital payloads into formats for distribution to various network components in accordance with one or more embodiments.

As mentioned above, in one or more embodiments, the schema modification system 102 can utilize payload schemas to adapt digital payloads across network components within a single system/platform or across multiple systems/platforms. In particular, the schema modification system 102 can store and access payload schemas within a schema repository for selection to adapt digital payloads between network components. FIG. 6 illustrates an example diagram of utilizing payload schemas for passing digital payloads between various network components in accordance with one or more embodiments.

As illustrated in FIG. 6, the schema modification system 102 receives one or more schema parameters 602. For example, the schema modification system 102 receives schema parameters 602 from one or more administrator devices and/or as hardcoded definitions for various aspects of one or more payload schemas. In some embodiments, the schema modification system 102 receives schema edits that define modifications to definitions of payload schemas (e.g., for adapting to version update of network components). Indeed, the schema modification system 102 can also receive version updates for network components that prompt the schema edits by affecting format compatibility between the network components (e.g., via breaking or non-breaking changes).

As shown, the schema modification system 102 can also receive annotations and/or annotation edits defining target network components for digital payloads, sensitive information treatment (e.g., removal or redaction), and/or instructions to generate specific computer code. For instance, the schema modification system 102 can receive a computer language choice and/or and encoding/format choice that indicate computer language (e.g., RUBY, PYTHON, GO, or others) that the schema modification system 102 can use for passing or processing digital payloads.

As further illustrated in FIG. 6, the schema modification system 102 stores payload schemas within a schema repository 604. Specifically, the schema modification system 102 stores payload schemas for converting digital payloads as described herein (e.g., to define the data shapes of digital payloads). Thus, the schema modification system 102 can access the schema payloads stored within the schema repository 604 to convert a digital payload between network components. Indeed, the schema modification system 102 can utilize various network components within the inter-network facilitation system 104 and/or a third-party system (e.g., the third-party system 116) to perform various processes or operations.

To elaborate, the schema modification system 102 can call, utilize, or access (APIs from) one or more third-party tools 606a and/or one or more native tools 606b. For example, the schema modification system 102 can generate payload conversion code in multiple languages using a combination of one or more third-party tools 606a and one or more native tools 606b. Additionally, the schema modification system 102 can perform compatibility detection (e.g., to determine whether the formats of two network components are compatible) by calling one or more third-party tools 606a. Further, the schema modification system 102 can perform (or cause a third-party system to perform) parameter validation, and linting by implementing one or more third-party tools.

As also illustrated in FIG. 6, the schema modification system 102 can utilize native tools 606b to perform various functions. For example, the schema modification system 102 can generate a payload conversion code for JSON schemas using a native conversion code generator for SEGMENT 610 (e.g., for providing digital payloads to SEGMENT via an asynchronous API call). Further, the schema modification system 102 can utilize native tools 606b to generate SNOW SQL statements (e.g., for providing digital payloads to SNOWFLAKE 612 via an asynchronous API call). The schema modification system 102 can also (according to one or more annotations) identify sensitive information (e.g., PII) for auditing and redaction using a data security tool 608 (e.g., as one of the third-party tools 606a or native tools 606b). While FIG. 6 illustrates some payload destinations, such as the data security tool 608, SEGMENT 610, and SNOWFLAKE 612, this list is not exhaustive and other destinations are possible, such as AMPLITUDE.

As shown, the schema modification system 102 can also provide digital payloads to a digital package library 614. For example, the schema modification system 102 can generate digital payloads in various converted/translated formats and can make the digital payloads accessible by other network components (e.g., via API calls or other references) by adding them to the digital package library 614. Other network components can then pull digital packages or payloads from the digital package library 614. Thus, the schema modification system 102 can provide compatible digital payloads for access by network components that call or reference the digital package library 614. Indeed, the schema modification system 102 can make the digital package library 614 accessible to network components from the digital package library 614.

Accordingly, as further illustrated in FIG. 6, the schema modification system 102 provides a digital payload to the source network component 616, whereupon the source network component 616 can analyze or process the digital payload to publish or provide a different digital payload to the target network component 620 via the data pipe 618. In some cases, the data pipe 618 can refer to a data stream for events or to an intermittent message notification publication/subscription component for passing digital payloads. The schema modification system 102 can further pass digital payloads (e.g., digital payloads generated or processed via the source network component 616) from the source network component 616 to other network components 622, to SEGMENT 610, and/or to SNOWFLAKE 612.

The components of the schema modification system 102 can include software, hardware, or both. For example, the components of the schema modification system 102 can include one or more instructions stored on a computer-readable storage medium and executable by processors of one or more computing devices (e.g., the computing device server(s) 106, the client device 118, and/or a third-party device). When executed by the one or more processors, the computer-executable instructions of the schema modification system 102 can cause a computing device to perform the methods described herein. Alternatively, the components of the schema modification system 102 can comprise hardware, such as a special purpose processing device to perform a certain function or group of functions. Additionally or alternatively, the components of the schema modification system 102 can include a combination of computer-executable instructions and hardware.

Furthermore, the components of the schema modification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the schema modification system 102 may be implemented as part of a stand-alone application on a personal computing device or a mobile device. Alternatively or additionally, the components of the schema modification system 102 may be implemented in any application that allows creation and delivery of marketing content to users, including, but not limited to, various applications.

FIGS. 1-6, the corresponding text, and the examples provide a number of different systems, methods, and non-transitory computer readable media for generating and utilizing payload schemas for facilitating seamless processing of digital payloads across network components. In addition to the foregoing, embodiments can also be described in terms of flowcharts comprising acts for accomplishing a particular result. For example, FIG. 7 illustrates a flowchart of an example sequence of acts in accordance with one or more embodiments.

Figure 7:
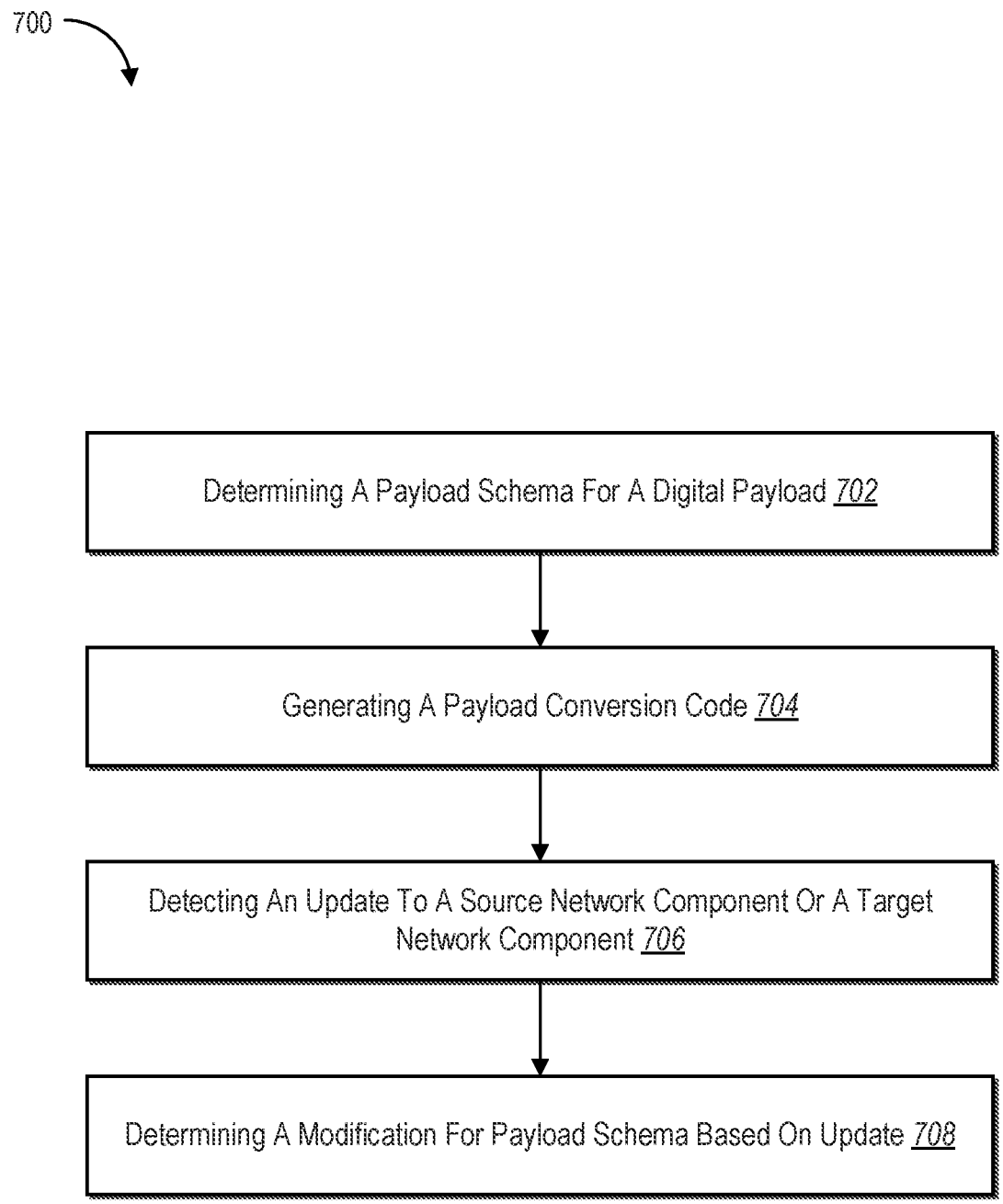
FIG. 7 illustrates an example series of acts for determining and utilizing a payload schema to convert a digital payload from a source format to a target format in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for generating and utilizing payload schemas for facilitating seamless processing of digital payloads across network components. The series of acts 700 can include an act 702 of determining a payload schema for a digital payload. In particular, the act 702 can involve determining, for database organization within an inter-network facilitation system, a payload schema comprising computer code defining organization of a digital payload generated by a server hosting a source network component.

As shown, the series of acts 700 also includes an act 704 of generating a payload conversion code. In particular, the act 704 can involve generating, from the payload schema, a payload conversion code for translating the digital payload into a target format of a target network component receiving the digital payload generated by the source network component.

Additionally, the series of acts 700 includes an act 706 of detecting an update to a source network component or a target network component. In particular, the act 706 can involve detecting a version update to one of the source network component or the target network component that renders the target format for the digital payload inconsistent with a source format for the digital payload.

As further illustrated in FIG. 7, the series of acts 700 includes an act 708 of determining a modification for the payload schema based on the update. In particular, the act 708 can involve, based on detecting the version update, automatically modifying the payload schema to adapt compatibility of the digital payload between the source network component and the target network component.

In some embodiments, the series of acts 700 includes an act of identifying a schema annotation comprising a parameter validation indicator defining how a parameter within the payload schema is validated within the inter-network facilitation system. The series of acts 700 can also include an act of validating the parameter of the payload schema according to the parameter validation indicator. Additionally (or alternatively), the series of acts 700 can include an act of generating multiple payload conversion codes from the payload schema by: determining multiple target formats associated with multiple target network components for the digital payload; and generating, from the payload schema, computer code for translating the digital payload from the source format to each of the multiple target formats.

In some cases, the series of acts 700 includes acts of identifying, for the payload schema, a schema annotation defining personally identifiable information within the digital payload, determining that the digital payload is intended for a third-party system, and, based on determining that the digital payload is intended for a third-party system, removing the personally identifiable information from the digital payload according to the schema annotation of the payload schema. The series of acts 700 can also include an act of detecting, within the payload schema, a schema annotation defining the target network component as a destination for the digital payload.

In some cases, the series of acts 700 includes an act of detecting the version update by detecting an upload of a new component version that results in a change to one or more of the source format for the source network component or the target format for the target network component. Further, the series of acts 700 can include an act of determining a modification for the payload schema to adapt compatibility by receiving updated definitions of the payload schema for organizing digital payloads to accommodate the change to one or more of the source format or the target format. In some embodiments, the series of acts 700 includes an act of generating the payload conversion code utilizing a payload conversion code generator that adapts to changes in data formats of network components.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
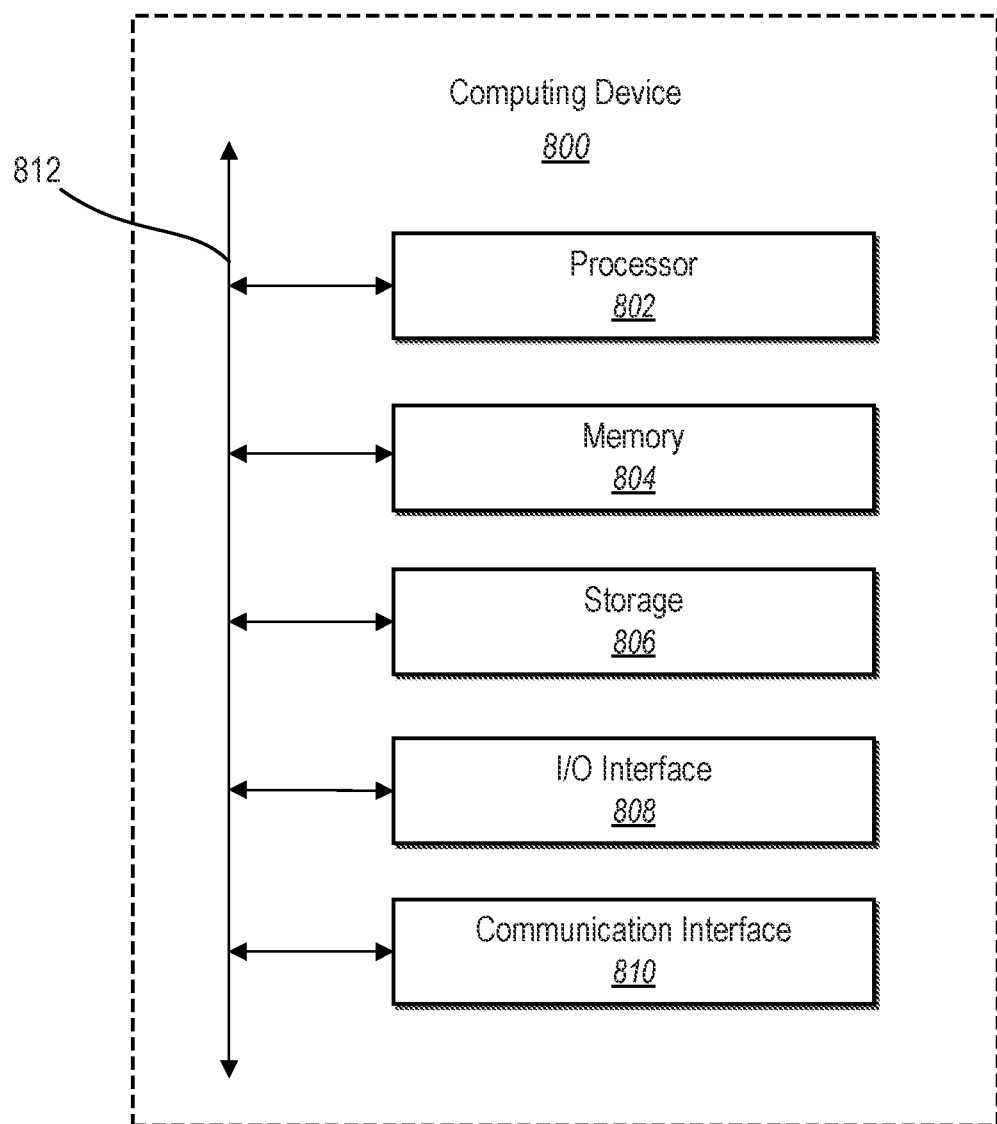
FIG. 8 illustrates a block diagram of a computing device for implementing one or more embodiments of the present disclosure.

FIG. 8 illustrates, in block diagram form, an exemplary computing device 800 (e.g., the client device 118, or the server(s) 106) that may be configured to perform one or more of the processes described above. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive ("HDD"), flash memory, a Universal Serial Bus ("USB") drive or a combination of these or other storage devices.

The computing device 800 also includes one or more input or output interface 808 (or "I/O interface 808"), which are provided to allow a user (e.g., requester or provider) to provide input to (such as user strokes), receive output from, and otherwise transfer data to and from the computing device 800. These I/O interface 808 may include a mouse, keypad or a keyboard, a touch screen, camera, optical scanner, network interface, modem, other known I/O devices or a combination of such I/O interface 808. The touch screen may be activated with a stylus or a finger.

The I/O interface 808 may include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that connects components of computing device 800 to each other.

Figure 9:
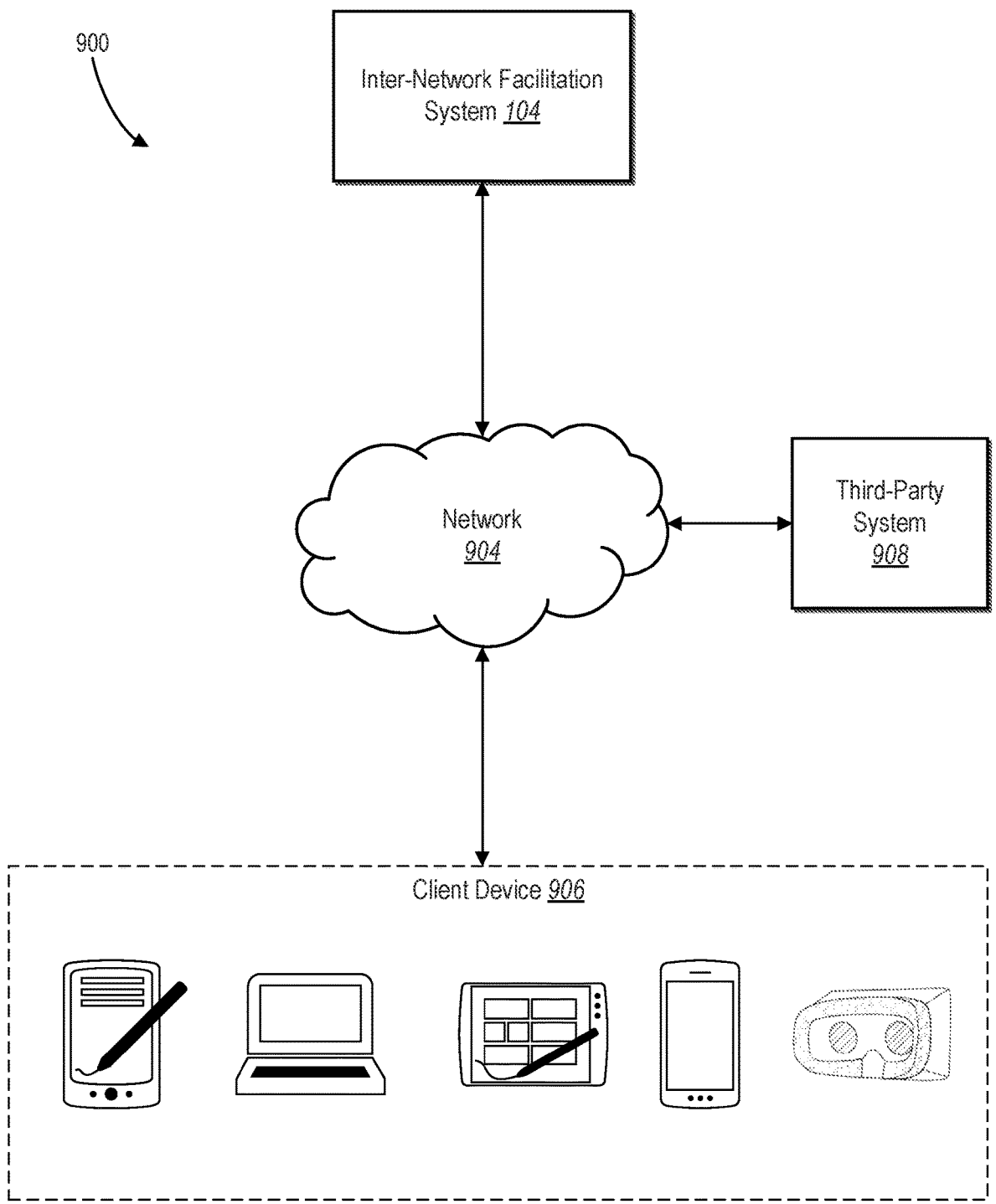
FIG. 9 illustrates an example environment for an inter-network facilitation system in accordance with one or more embodiments.

FIG. 9 illustrates an example network environment 900 of the inter-network facilitation system 104. The network environment 900 includes a client device 906 (e.g., client device 118), an inter-network facilitation system 104, and a third-party system 908 (e.g., the third-party system 116) connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client devices 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, the inter-network facilitation system 104 (which hosts the schema modification system 102), and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 8. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party system 908. For example, the inter-network facilitation system 104 may receive authentication credentials from a user to link a third-party system 908 such as an online banking system to link an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) between user accounts or across accounts of different third-party systems 908, and to present corresponding information via the client device 906.

In particular embodiments, the inter-network facilitation system 104 includes a model (e.g., a machine learning model) for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A method comprising:
determining, for database organization within an inter-network facilitation system, a payload schema comprising computer code defining organization of a digital payload generated by a server hosting a source network component;
generating and storing, in a single database location associated with the payload schema, a set of multi-level schema annotations defining computer functions executable using data fields of the payload schema, wherein the set of multi-level schema annotations define the computer functions at a file level, a payload level, and a data field level of the payload schema;
utilizing an evolving payload conversion code generator to generate, from the payload schema, a payload conversion code for translating the digital payload into a target format of a target network component receiving the digital payload generated by the source network component, the evolving payload conversion code generator generating the payload conversion code as computer code executable to modify the digital payload from a first data structure comprising parameters of the digital payload according to a source format of the source network component to a second data structure comprising parameters of the digital payload according to the target format of the target network component;
detecting a version update to one of the source network component or the target network component that renders the target format for the digital payload inconsistent with the source format for the digital payload; and based on detecting the version update, determining a modification for the payload schema to adapt compatibility of the digital payload between the source network component and the target network component.

2. The method of claim 1, further comprising:
identifying a schema annotation comprising a parameter validation indicator defining how a parameter within the payload schema is validated within the inter-network facilitation system; and
validating the parameter of the payload schema according to the parameter validation indicator.

3. The method of claim 1, further comprising:
identifying, for the payload schema, a schema annotation defining personally identifiable information within the digital payload;
determining that the digital payload is intended for a third-party system; and
based on determining that the digital payload is intended for a third-party system, removing the personally identifiable information from the digital payload according to the schema annotation of the payload schema.

4. The method of claim 1, further comprising detecting, within the payload schema, a schema annotation defining the target network component as a destination for the digital payload.

5. The method of claim 1, further comprising utilizing the evolving payload conversion code generator to generate multiple payload conversion codes from the payload schema by:
detecting compatibility of multiple target network components;
determining multiple target formats associated with the multiple target network components for the digital payload; and
generating, from the payload schema, computer code for translating the digital payload from the source format to each of the multiple target formats.

6. The method of claim 1, further comprising:
detecting the version update by detecting an upload of a new component version that results in a change to one or more of the source format for the source network component or the target format for the target network component; and
determining a modification for the payload schema to adapt compatibility by receiving updated definitions of the payload schema for organizing digital payloads to accommodate the change to one or more of the source format or the target format.

7. The method of claim 1, further comprising generating a tracking plan for validating the digital payload in accordance with the target format of the target network component.

8. A system comprising:
at least one processor; and
a non-transitory computer readable medium comprising instructions that, when executed by the at least one processor, cause the system to:
determine, for database organization within an inter-network facilitation system, a payload schema comprising computer code defining organization of a digital payload generated by a server hosting a source network component;
generate and store, in a single database location associated with the payload schema, a set of multi-level schema annotations defining computer functions executable using data fields of the payload schema, wherein the set of multi-level schema annotations define the computer functions at a file level, a payload level, and a data field level of the payload schema;
utilize an evolving payload conversion code generator to generate, from the payload schema, a payload conversion code for translating the digital payload into a target format of a target network component receiving the digital payload generated by the source network component, the evolving payload conversion code generator generating the payload conversion code as computer code executable to modify the digital payload from a first data structure comprising parameters of the digital payload according to a source format of the source network component to a second data structure comprising parameters of the digital payload according to the target format of the target network component;
detect a version update to one of the source network component or the target network component that renders the target format for the digital payload inconsistent with the source format for the digital payload; and
based on detecting the version update, determine a modification for the payload schema to adapt compatibility of the digital payload between the source network component and the target network component.

9. The system of claim 8, further comprising instructions that, when executed by the at least one processor, cause the system to:
identify a schema annotation comprising a parameter validation indicator defining how a parameter within the digital payload is validated within the inter-network facilitation system; and
validate the parameter of the digital payload according to the parameter validation indicator.

10. The system of claim 8, further comprising instructions that, when executed by the at least one processor, cause the system to:
identify, for the payload schema, a schema annotation defining personally identifiable information within the digital payload;
determine that the digital payload is intended for a third-party system; and
based on determining that the digital payload is intended for a third-party system, remove the personally identifiable information from the digital payload according to the schema annotation of the payload schema.

11. The system of claim 8, further comprising instructions that, when executed by the at least one processor, cause the system to detect, within the payload schema, a schema annotation indicating specific uses or applications for data fields.

12. The system of claim 8, further comprising instructions that, when executed by the at least one processor, cause the system to utilize the evolving payload conversion code generator to generate multiple payload conversion codes from the payload schema by:
detecting compatibility of multiple target network components;
determining multiple target formats associated with the multiple target network components for the digital payload; and
generating, from the payload schema, computer code for translating the digital payload from the source format to each of the multiple target formats.

13. The system of claim 8, further comprising instructions that, when executed by the at least one processor, cause the system to:
- detect the version update by detecting an upload of a new component version that results in a change to one or more of the source format for the source network component or the target format for the target network component; and
- determine a modification for the payload schema to adapt compatibility by receiving updated definitions of the payload schema for organizing digital payloads to accommodate the change to one or more of the source format or the target format.

14. The system of claim 8, further comprising instructions that, when executed by the at least one processor, cause the system to generate a tracking plan for validating the digital payload in accordance with the target format of the target network component.

15. A non-transitory computer readable medium comprising instructions that, when executed by at least one processor, cause a computing device to:
- determine, for database organization within an inter-network facilitation system, a payload schema comprising computer code defining organization of a digital payload generated by a server hosting a source network component;
- generate and store, in a single database location associated with the payload schema, a set of multi-level schema annotations defining computer functions executable using data fields of the payload schema, wherein the set of multi-level schema annotations define the computer functions at a file level, a payload level, and a data field level of the payload schema;
- utilize an evolving payload conversion code generator to generate, from the payload schema, a payload conversion code for translating the digital payload into a target format of a target network component receiving the digital payload generated by the source network component, the evolving payload conversion code generator generating the payload conversion code as computer code executable to modify the digital payload from a first data structure comprising parameters of the digital payload according to a source format of the source network component to a second data structure comprising parameters of the digital payload according to the target format of the target network component;
- detect a version update to one of the source network component or the target network component that renders the target format for the digital payload inconsistent with the source format for the digital payload; and
- based on detecting the version update, determine a modification for the payload schema to adapt compatibility of the digital payload between the source network component and the target network component.

16. The non-transitory computer readable medium of claim 15, further comprising instructions that, when executed by the at least one processor, cause the computing device to:
- identify a schema annotation comprising a parameter validation indicator defining how a parameter within the payload schema is validated within the inter-network facilitation system; and
- validate the parameter of the payload schema according to the parameter validation indicator.

17. The non-transitory computer readable medium of claim 15, further comprising instructions that, when executed by the at least one processor, cause the computing device to:
- identify, for the payload schema, a schema annotation defining personally identifiable information within the digital payload;
- determine that the digital payload is intended for a third-party system; and
- based on determining that the digital payload is intended for a third-party system, remove the personally identifiable information from the digital payload according to the schema annotation of the payload schema.

18. The non-transitory computer readable medium of claim 15, further comprising instructions that, when executed by the at least one processor, cause the computing device to determine, based on a schema annotation, to block or remove data parameters for a given field.

19. The non-transitory computer readable medium of claim 15, further comprising instructions that, when executed by the at least one processor, cause the computing device to utilize the evolving payload conversion code generator to generate multiple payload conversion codes from the payload schema by:
- detecting compatibility of multiple target network components;
- determining multiple target formats associated with the multiple target network components for the digital payload; and
- generating, from the payload schema, computer code for translating the digital payload from the source format to each of the multiple target formats.

20. The non-transitory computer readable medium of claim 15, further comprising instructions that, when executed by the at least one processor, cause the computing device to:
- detect the version update by detecting an upload of a new component version that results in a change to one or more of the source format for the source network component or the target format for the target network component; and
- determine a modification for the payload schema to adapt compatibility by received updated definitions of the payload schema for organizing digital payloads to accommodate the change to one or more of the source format or the target format.

\* \* \* \* \*